US012694019B1

(12) United States Patent
Vu et al.

(10) Patent No.: US 12,694,019 B1
(45) Date of Patent: Jul. 28, 2026

(54) FORM CONVERSION USING PREFERENCE ALIGNMENT TRAINING

(71) Applicant: Oracle International Corporation, Redwood Shores, CA (US)

(72) Inventors: Thanh Tien Vu, Herston (AU); Prashan Madumal, Melbourne (AU); Omid Mohamad Nezami, Sydney (AU); Cong Duy Vu Hoang, Wantirna South (AU); Gioacchino Tangari, Sydney (AU); Duy Vu, Melbourne (AU); Dai Quoc Nguyen, Raceview (AU); Yakupitiyage Don Thanuja Samodhye Dharmasiri, Melbourne (AU); Ying Xu, Melbourne (AU); Thanh Long Duong, Melbourne (AU); Clemence Andree Simone Lanfranchi, Zurich (CH); Damien Alexandre Hilloulin, Zurich (CH); Rhicheek Patra, Zurich (CH); Sungpack Hong, Palo Alto, CA (US); Hassan Chafi, Zurich (CH)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 19/040,650

(22) Filed: Jan. 29, 2025

(51) Int. Cl.

| | |
|---|---|
| ***G06F 16/242*** | (2019.01) |
| ***G06N 3/0475*** | (2023.01) |
| ***G06N 3/0985*** | (2023.01) |

(52) U.S. Cl.
CPC ......... *G06F 16/243* (2019.01); *G06N 3/0475* (2023.01); *G06N 3/0985* (2023.01)

(58) Field of Classification Search
CPC ... G06F 16/243; G06N 3/0475; G06N 3/0985
See application file for complete search history.

(56) References Cited

U.S. PATENT DOCUMENTS

| | | | |
|---|---|---|---|
| 2022/0375605 | A1 | 11/2022 | Lipton et al. |
| 2023/0161963 | A1 | 5/2023 | Vu et al. |

(Continued)

FOREIGN PATENT DOCUMENTS

| | | | |
|---|---|---|---|
| CN | 116522926 | A | 8/2023 |
| CN | 117076718 | A | 11/2023 |
| CN | 117252265 | A | 12/2023 |

OTHER PUBLICATIONS

An, et al., "Training-Free Long-Context Scaling of Large Language Models", Available online at: https://arxiv.org/html/2402.17463v1, Feb. 27, 2024, pp. 1-37.

(Continued)

*Primary Examiner* — Aleksandr Kerzhner
*Assistant Examiner* — Aryan D Toughiry
(74) *Attorney, Agent, or Firm* — Kilpatrick Townsend & Stockton LLP

(57) ABSTRACT

Techniques are disclosed herein for automatically curating preference alignment training (PAT) data and subsequently using the PAT data to train a machine-learning model used to perform natural language-to-query language tasks. A first PAT dataset is generated using a first trained LLM in an execution-based data generation technique. A second PAT dataset is generated using a second trained LLM in a LLM-based data generation technique. The second PAT dataset is populated with synthetic data points generated by the second trained LLM. Each data point of first PAT dataset and the second PAT dataset comprises a natural language query and an executable and non-executable query language statement. The first PAT dataset and the second PAT dataset can be combined and filtered to generate a PAT dataset that is optimized for training a machine-learning model to overcome one or more weaknesses exhibited when generating (Continued)

query language statements responsive to natural language questions.

20 Claims, 15 Drawing Sheets

(56) References Cited

U.S. PATENT DOCUMENTS

2023/0274089 A1 8/2023 Tunstall-Pedoe et al.
2023/0352127 A1 11/2023 Sivan et al.

OTHER PUBLICATIONS

Chen, et al., "Iterative Prompt Refinement for Mining Gene Relationships from ChatGPT", bioRxiv: The Preprint Server for Biology, Available online at: https://www.biorxiv.org/content/10.1101/2023.12.23.573201v1.full.pdf/, Dec. 23, 2023, pp. 1-33.

Choi, et al., "QuAC: Question Answering in Context", Available online at: https://arxiv.org/pdf/1808.07036, Aug. 28, 2018, 11 pages.

Faramarzi, et al., "Context-aware Medication Event Extraction from Unstructured Text", Available online at: https://aclanthology.org/2023.clinicalnlp-1.11.pdf, Jul. 14, 2023, pp. 86-95.

Li, et al., "Exploring Multi-Document Information Consolidation for Scientific Sentiment Summarization", Available online at: https://arxiv.org/html/2402.18005v1, Feb. 28, 2024, 18 pages.

Lyu, et al., "Automatic Summarization of Doctor-Patient Encounter Dialogues Using Large Language Model through Prompt Tuning", Available online at: https://arxiv.org/pdf/2403.13089, Mar. 19, 2024, 8 pages.

Madaan, et al., "Self-Refine: Iterative Refinement with Self-Feedback", Available online at: https://arxiv.org/pdf/2303.17651, May 25, 2023, 54 pages.

Mukherjee, et al., "Polaris: A Safety-focused LLM Constellation Architecture for Healthcare", Available online at: https://arxiv.org/pdf/2403.13313, Mar. 20, 2024, pp. 1-53.

Neupane, et al., "MedInsight: A Multi-Source Context Augmentation Framework for Generating Patient-Centric Medical Responses using Large Language Models", Computation and Language, Available online at: https://arxiv.org/pdf/2403.08607, Mar. 13, 2024, pp. 1-18.

Nguyen, et al., "Using GPT-4 to Provide Tiered, Formative Code Feedback", Available online at: https://dl.acm.org/doi/pdf/10.1145/3626252.3630960, Mar. 2024, pp. 958-964.

Santu, et al., "Prompting LLMs to Compose Meta-Review Drafts from Peer-Review Narratives of Scholarly Manuscripts", Computation and Language, Available online at: https://arxiv.org/html/2402.15589v1, Feb. 23, 2024, 16 pages.

Savkov, et al., "Annotating Patient Clinical Records with Syntactic Chunks and Named Entities: The Harvey Corpus", Lang Resources & Evaluation, Available online at: https://link.springer.com/article/10.1007/s10579-015-9330-7, Jan. 11, 2016, pp. 523-548.

Singh, et al., "Large Scale Sequence-to-Sequence Models for Clinical Note Generation from Patient-Doctor Conversations", Available online at: https://aclanthology.org/2023.clinicalnlp-1.18.pdf, Jul. 14, 2023, pp. 138-143.

Sordoni, et al., "Joint Prompt Optimization of Stacked LLMs using Variational Inference", Available online at: https://proceedings.neurips.cc/paper_files/paper/2023/file/b5afe13494c825089b1e3944fdaba212-Paper-Conference.pdf, Jun. 2023, pp. 1-24.

Zhang, et al., "Leveraging Pretrained Models for Automatic Summarization of Doctor-Patient Conversations", Available online at: https://arxiv.org/pdf/2109.12174, Sep. 24, 2021, 20 pages.

Zhang, et al., "PREFER: Prompt Ensemble Learning via Feedback-Reflect-Refine", The Thirty-Eighth Association for the Advancement of Artificial Intelligence Conference on Artificial Intelligence (Association for the Advancement of Artificial Intelligence—24), Mar. 24, 2024, pp. 19525-19532.

1000

ACCESS A SET OF DATA POINTS OF A TRAINING DATASET, EACH DATAPOINT INCLUDING AT LEAST A NL QUERY, AND A CORRECT QUERY LANGUAGE STATEMENT FOR THE NL QUERY

1002

GENERATE A FIRST PREFERENCE ALIGNMENT TRAINING DATASET FROM A FIRST SUBSET OF THE DATA POINTS

1004

GENERATE A SECOND PREFERENCE ALIGNMENT TRAINING DATASET FROM A SECOND SUBSET OF THE DATA POINTS

1006

GENERATE A PREFERENCE ALIGNMENT TRAINING DATASET BY COMBINING THE FIRST PREFERENCE ALIGNMENT TRAINING DATASET AND THE SECOND PREFERENCE TRAINING DATASET, WHEREIN THE COMBINING COMPRISES PERFORMING AT LEAST ONE FILTERING OPERATION ON THE FIRST PREFERENCE ALIGNMENT TRAINING DATASET AND THE SECOND PREFERENCE TRAINING DATASET

1008

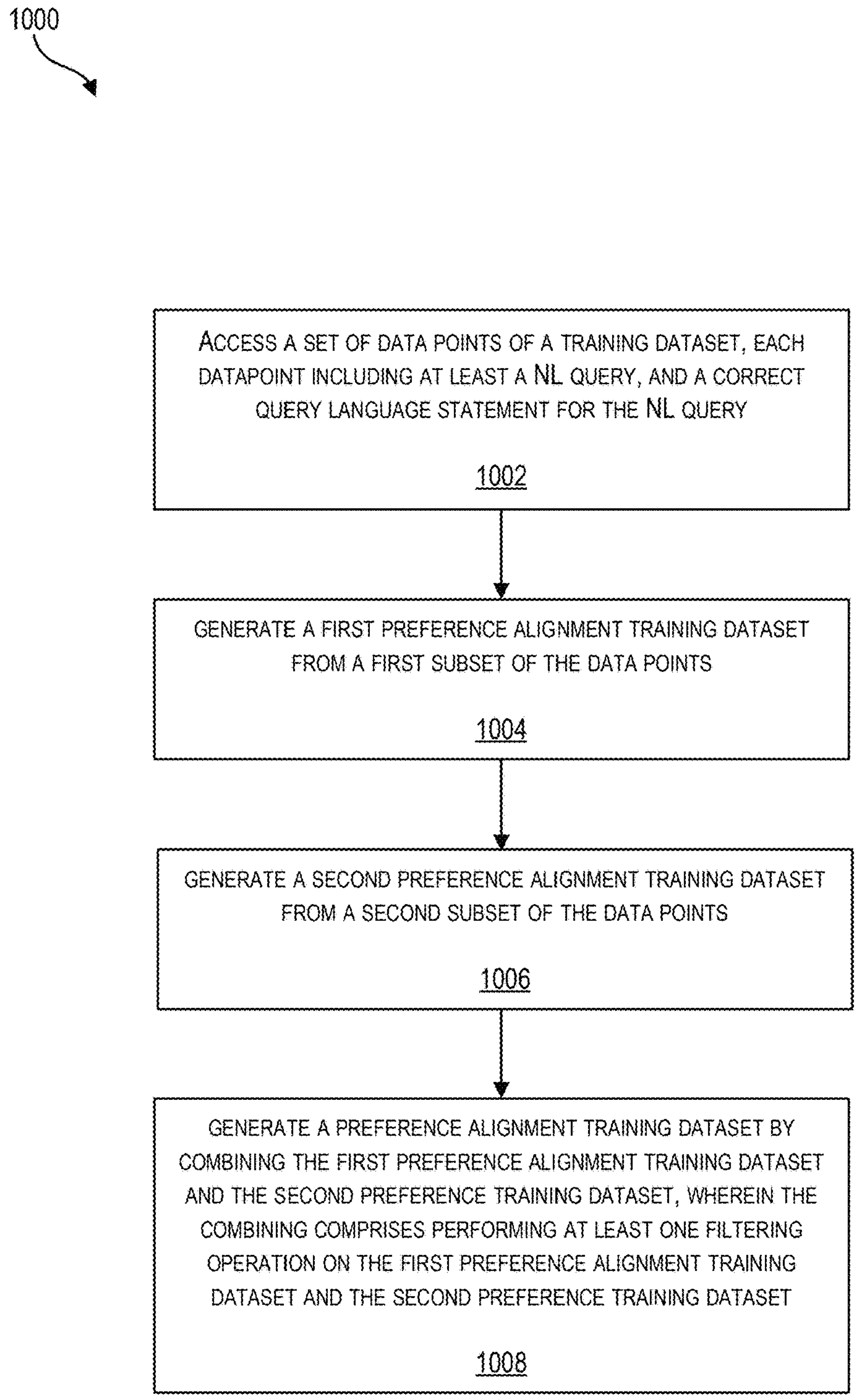

*FIG. 10*

FORM CONVERSION USING PREFERENCE ALIGNMENT TRAINING

FIELD

The present disclosure generally relates to transforming natural language to logical form, and more particularly, to generating preference alignment training data for improving language model performance when transforming natural language queries to executable database query language statements.

BACKGROUND

The advent of database management systems has revolutionized the way large datasets are stored, managed, and queried. Traditional databases, such as relational databases, have become the backbone of many applications across various industries. These databases are structured to store data in tables, allowing for the organization and retrieval of information in a systematic manner. The efficiency and reliability of databases have made them indispensable in fields such as finance, healthcare, and e-commerce, where large volumes of data need to be managed with precision and speed.

While there are various languages for manipulating data in databases, Structured Query Language (SQL) has been the primary tool for interacting with relational databases. SQL allows users to perform a wide range of operations, including data insertion, updates, deletions, and complex queries to retrieve specific information. The power and flexibility of SQL have made it the standard language for database management. However, the effective use database languages such as SQL can require a certain level of expertise, as constructing accurate and efficient queries can be complex and challenging for users who are not well-versed in the language.

In recent years, there has been a significant development in the field of databases with the emergence of text-to-logical form systems, such as but not limited to, text-to-query language (e.g., text-to-SQL) systems. Systems such as text-to-SQL systems, are designed to bridge the gap between natural language and database query language, enabling users to interact with databases using plain, conversational language. More specifically, text-to-query language systems can leverage advanced natural language processing (NLP) techniques and machine learning algorithms to translate user queries expressed in natural language into executable database query language commands. This innovation has the potential to democratize access to databases, allowing users without specialized query language knowledge to efficiently retrieve and manipulate data.

The integration of text-to-query language systems into database management represents a significant advancement in making databases more accessible and user-friendly. By simplifying the interaction with databases, these systems can enhance productivity and reduce the learning curve associated with database management. As businesses and organizations continue to accumulate and rely on large datasets, the ability to easily and accurately query databases using natural language will become increasingly valuable. This disclosure presents techniques related to the improvement and implementation of text-to-query language technologies including text-to-SQL, ensuring that the benefits of these advancements can be realized across various domains.

BRIEF SUMMARY

Techniques are disclosed herein for generating preference alignment training data that can be used for finetuning a language model to transform natural language to a logical form.

In some embodiments, a computer-implemented method includes accessing a set of data points of a training dataset, where each data point of the set of data points comprises a prompt including a natural language query and a correct query language statement for the natural language query. The computer-implemented method also includes generating a first preference alignment training dataset by predicting, using a first trained large language model, candidate query language statements for the natural language queries of a first subset of data points of the set of data points, determining that the candidate query language statements are not executable by submitting the candidate query language statements to a database system, after determining that the candidate query language statements are not executable, producing an updated version of the first subset of data points by including the candidate query language statements in the first subset of data points as incorrect query language statements for the natural language queries of the first subset of data points, and including the updated version of the first subset of data points in the first preference alignment training dataset. The computer-implemented method additionally includes generating a second preference alignment training dataset by causing a second trained large language model to generate synthetic natural language queries based on database schemas defined in the prompts of a second subset of data points of the set of data points, causing the second trained large language model to predict, based on the synthetic natural language queries, executable synthetic query language statements for the synthetic natural language queries, causing the second trained large language model to predict, based on the synthetic natural language queries, non-executable synthetic query language statements for the synthetic natural language queries, generating a plurality of synthetic data points comprising the synthetic natural language queries, the executable synthetic query language statements, and non-executable synthetic query language statements, and including the plurality of synthetic data points in the second preference alignment training dataset. The computer-implemented method further includes generating a preference alignment training dataset by combining the first preference alignment training dataset and the second preference training dataset, wherein combining the first preference alignment training dataset and the second preference training dataset comprises performing at least one filtering operation of a plurality of filtering operations on the first preference alignment training dataset and the second preference training dataset.

In some embodiments, the computer-implemented method further includes accessing a machine-learning model, using the preference alignment training dataset to generate a fine-tuned version of the machine-learning model, and deploying the fine-tuned version of the machine-learning model to a system.

In some embodiments, performing the at least one filtering operation of the plurality of filtering operations includes, for each synthetic data point in the second preference alignment training dataset, determining whether the executable synthetic query language statement is executable and whether the non-executable synthetic query language statement is not executable by submitting the executable synthetic query language statement and the non-executable synthetic query language statement to the database system.

In some embodiments, performing the at least one filtering operation of the plurality of filtering operations further includes generating a filtered second preference alignment training dataset by removing from the second preference alignment training dataset any synthetic data points that are determined to erroneously include an executable synthetic query language statement that is not executable or a non-executable synthetic query language statement that is executable.

In some embodiments, performing the at least one filtering operation of the plurality of filtering operations further includes scoring, using at least one large language model-as-a-judge trained to grade query language statements, a quality of the executable query language statement and the non-executable query language statement of each data point of the updated version of the first subset of data points in the first preference alignment training dataset and a quality of the executable synthetic query language statement and the non-executable synthetic query language statement of each synthetic data point in the filtered second preference alignment training dataset, given the prompts associated therewith.

In some embodiments, performing the at least one filtering operation of the plurality of filtering operations further includes optimizing the preference alignment training dataset to include only a plurality of the data points of the updated version of the first subset of data points in the first preference alignment training dataset having executable query language statements and non-executable query language statements receiving quality scores that meet predetermined threshold values, and a plurality of the synthetic data points of the second preference alignment training dataset having executable synthetic query language statements and non-executable synthetic query language statements receiving quality scores that meet predetermined threshold values.

In some embodiments, the at least one large language model-as-a-judge is a plurality of large language model judges and the plurality of large language model judges are used in one or both of two different configurations that include a panel configuration where each large language model judge is assigned a different weight based on a strength of the large language model used as the judge, and a serial configuration where the plurality of large language model judges are arranged from weakest to strongest, and filtering occurs at each large language model judge in a serial manner.

Some embodiments include a system that includes one or more processors; and one or more computer-readable media storing instructions which, when executed by the one or more processors, cause the system to perform part or all of the operations and/or methods disclosed herein.

Some embodiments include one or more non-transitory computer-readable media storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 10 is an example of a process for automatically curating preference alignment training data for subsequent use in finetuning a language model used to perform natural language-to-query language tasks according to certain embodiments.

DETAILED DESCRIPTION

Figure 1:
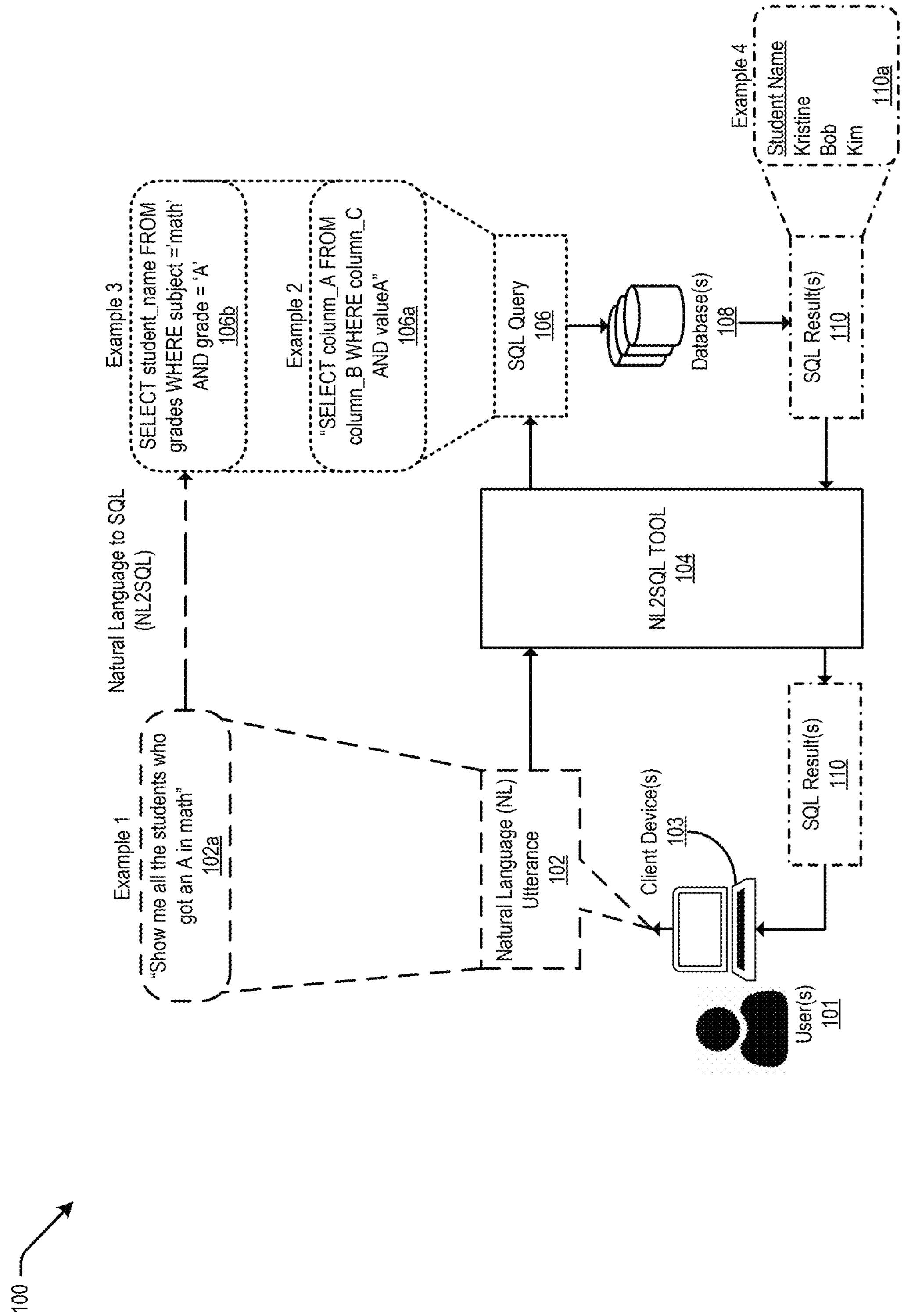
FIG. 1 is a simplified block diagram of a natural language-to-query language tool according to certain embodiments.

In recent years, the amount of data powering different industries and the systems operated by those industries has been increasing exponentially. A majority of business information is stored in the form of relational databases that store, process, and retrieve data. Databases power information systems across multiple industries, for instance, consumer tech (e.g., orders, cancellations, refunds), supply chain (e.g., raw materials, stocks, vendors), healthcare (e.g., medical records), finance (e.g., financial business metrics), customer support, search engines, and much more. It is imperative for modern data-driven companies to track the real-time state of its business in order to quickly understand and diagnose any emerging issues, trends, or anomalies in the data and take immediate corrective actions. This work is usually performed manually by analysts who compose complex queries in query languages (e.g., database query languages such as declarative query languages) like SQL, PGQL, logical database queries, API query languages such as GraphQL, REST, and so forth. Composing such queries can be used to derive insightful information from data stored in multiple tables.

These results are typically processed in the form of charts or graphs to enable users to quickly visualize the results and facilitate data-driven decision making.

Although common database queries (e.g., SQL queries) are often predefined and incorporated in commercial products, any new or follow-up queries still need to be manually coded by the analysts. Such static interactions between database queries and consumption of the corresponding results require time-consuming manual intervention and result in slow feedback cycles. It is vastly more efficient to have non-technical users (e.g., business leaders, doctors, or other users of the data) directly interact with the analytics tables via natural language (NL) queries that abstract away the underlying query language (e.g., SQL) code. Defining the database query requires a strong understanding of database schema and query language syntax and can quickly become overwhelming for beginners and non-technical stakeholders. Efforts to bridge this communication gap have led to the development of a new type of processing called natural language interfaces for databases (NLIDB). This natural search capability has become more popular over recent years as companies are developing deep-learning approaches for natural language to logical form (NL2LF), such as natural language to SQL (NL2SQL).

Logical form can refer to (i) programming query languages, (ii) intermediate forms, and/or (iii) programming languages. Programming query languages can include database query languages. Examples of programming query languages can include, but are not limited to, SQL, PQL, GraphQL, SPARQL, and the like. Intermediate forms can refer to machine-oriented languages and/or meaning representation languages (MRLs) such as OMRL, AMRL, and the like. Examples of programming languages include, but are not limited to, Python, C++, Java, Ruby, and the like. NL2SQL seeks to transform natural language questions to SQL, allowing individuals to run unstructured queries against databases. The converted SQL could also enable digital assistants such as chatbots and others to improve their responses when the answer can be found in different databases or tables with different schemas.

In some instances, NL2SQL transforms natural language to SQL using generative artificial intelligence models such as large language models (LLMs). An LLM is a type of artificial intelligence (AI) that is trained to understand, generate, and manipulate human language (e.g., text data) in a coherent and contextually relevant manner. LLMs have resulted in significant progress in natural language processing tasks such as text-to-code (e.g., text-to-SQL), text generation and translation, and sentiment analysis. Due to their attention mechanisms and deep neural architectures, LLMs excel at capturing nuanced language patterns and correlations in massive volumes of text data. LLMs are designed to predict the next word or token in a sequence of text by computing a probability distribution over a fixed vocabulary for the next token based on the context of the preceding tokens. The prediction is achieved through a series of self-attention mechanisms incorporated in the LLMs that assign varying degrees of importance to different parts of the input sequence that enable the LLMs to make informed predictions. LLMs generate contextually appropriate and coherent text by learning a fixed vocabulary from enormous text corpora and predicting which token included in the fixed vocabulary should be the next token in an output sequence.

To facilitate wide applicability, LLMs are often trained on enormous amounts of unannotated data, which can result in large, fixed vocabularies (e.g., a vocabulary of 32,000 tokens). However, due in part to the size of these vocabularies, LLMs tend to suffer from hallucinations relating to the creation of content (e.g., natural language-to-query language commands, etc.) that are neither correct nor factual but appear to be believable within the context of the input. These incorrect outputs frequently stray from the expected content and/or include fictitious information that is not present in the input text.

To reduce hallucinations and increase robustness, LLMs trained on enormous amounts of unannotated data are often fine-tuned and conditioned for a particular domain and/or use case using additional training data. For example, in the context of a domain-specific use case such as natural language-to-query language conversion, the training data typically also includes a large number of text-to-query language and query language-to-text examples. However, even when an LLM is trained and focused on a domain-specific use case, the performance of the LLM still tends to suffer from hallucinations and robustness due in part to its vast vocabulary. For example, in the case of natural language-to-query language conversion, query language statements generated by the LLM, while valid, may not be related to the goal of the user or the underlying database structure. In another example, the query language statements generated by an LLM may query non-existent database tables, include non-existent database attributes, and/or use incorrect syntax. As a result, erroneous query execution, failed data retrieval, and decreased query accuracy may occur.

In addition to still suffering from hallucinations, fine-tuned, LLMs may also exhibit other weaknesses associated with generating properly executable query language statements. For example, it has been found that even after supervised finetuning (SFT) directed to natural language-to-query language performance, LLMs often struggle with query language statement generation functions such as complex JOIN statements, date/time handling with absolute and relative dates, aggregation robustness with business logic, and value matching.

Accordingly, a different approach is needed to address these challenges and others. The techniques described herein can be utilized to automatically curate preference alignment training data that includes incorrect query language statements and can be subsequently used to train (e.g., finetune) a machine-learning model (e.g., LLM) in a manner that targets the weaknesses of the machine-learning model when performing natural language-to-query language tasks and improves the quality of query language statements generated by the machine-learning model in response to natural language questions. In one particular aspect, a computer-implemented method includes accessing a set of data points of a training dataset, where each data point of the set of data points comprises a prompt including a natural language query and a correct query language statement for the natural language query; generating a first preference alignment training dataset by predicting, using a first trained large language model, candidate query language statements for the natural language queries of a first subset of data points of the set of data points, determining that the candidate query language statements are not executable by submitting the candidate query language statements to a database system, after determining that the candidate query language statements are not executable, producing an updated version of the first subset of data points by including the candidate query language statements in the first subset of data points as incorrect query language statements for the natural language queries of the first subset of data points, and including the updated version of the first subset of data points in the first preference alignment training dataset; generating a second preference alignment training dataset by causing a second trained large language model to generate synthetic natural language queries based on database schemas defined in the prompts of a second subset of data points of the set of data points, causing the second trained large language model to predict, based on the synthetic natural language queries, executable synthetic query language statements for the synthetic natural language queries, causing the second trained large language model to predict, based on the synthetic natural language queries, non-executable synthetic query language statements for the synthetic natural language queries, generating a plurality of synthetic data points comprising the synthetic natural language queries, the executable synthetic query language statements, and non-executable synthetic query language statements, and including the plurality of synthetic data points in the second preference alignment training dataset; and generating a preference alignment training dataset by combining the first preference alignment training dataset and the second preference training dataset, wherein combining the first preference alignment training dataset and the second preference training dataset comprises performing at least one filtering operation of a plurality of filtering operations on the first preference alignment training dataset and the second preference training dataset.

Overview of Agents and NL-to-Query Language Framework

An agent (also referred to as a skill, chatbot, chatterbot, talkbot, digital assistant, or the like) is a computer program that can perform conversations with end users. The agent can generally respond to natural-language messages (e.g., questions or comments) through a messaging application that uses natural-language messages. Enterprises may use one or more agent systems to communicate with end users through a messaging application. The messaging application, which may be referred to as a channel, may be an end user preferred messaging application that the end user has already installed and is familiar with. Thus, the end user does not need to download and install new applications in order to chat with the agent system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

End users may interact with the agent system through a conversational interaction (sometimes referred to as a conversational user interface (UI)), just as with interactions between people. In some cases, the interaction may include the end user providing a utterance such as the query: "Please retrieve all invoices greater than ten thousand dollars for the last four years for Customer Y", to the agent, and the agent responding with a natural language response for the query based on translation of the user's natural language query to a database (e.g., SQL) query and execution of the SQL query on an appropriate database.

In some embodiments, the agent system may intelligently handle end user interactions without interaction with an administrator or developer of the agent system. For example, an end user may send one or more messages to the agent system in order to achieve a desired goal. A message may include certain content, such as natural language text, audio, image, video, or other methods of conveying a message. In some embodiments, the agent system may convert the content into a standardized logical form (e.g., a SQL query). The agent system may also prompt the end user for additional input parameters or request other additional information. In some embodiments, the agent system may also initiate communication with the end user, rather than passively responding to end user utterances. Described herein are various techniques for identifying an explicit invocation of an agent system and determining an input for the agent system being invoked.

FIG. 1 depicts a simplified diagram of an environment 100 incorporating an exemplary natural language-to-query language tool which, in this example, is a NL2SQL tool 104. Environment 100 includes the NL2SQL tool 104, which enables users 101 to receive a SQL query result based on a provided natural language utterance 102. FIG. 1 further depicts the NL2SQL tool 104 configured to generate a SQL query 106 and one or more SQL query result(s) 110 based on the provided natural language utterance 102. Other examples may implement tasks in addition to or alternative to SQL query generation (e.g., schema checking, schema linking, sentence completion, extraction of key information, debugging, and other SQL related tasks). The NL2SQL tool 104 can be implemented using software only, using hardware only, or using a combination of hardware and software. In some instances, the environment 100 is part of an Infrastructure as a Service (IaaS) cloud service (described in more detail with respect to FIGS. 11-15) and the NL2SQL tool can be implemented as part of the IaaS by leveraging the scalable computing resources and storage capabilities provided by the IaaS provider to process and manage large volumes of data and complex computations. This setup can allow the NL2SQL tool 104 to deliver real-time, responsive interactions while ensuring high availability, security, and performance scalability to meet varying demand levels. The NL2SQL tool 104 can be embodied or implemented in various physical systems or devices, such as in a computer, a mobile phone, a watch, an appliance, a vehicle, and the like. For the purposes of this example, the NL2SQL tool 104 generates and accepts queries related to SQL, but some examples may generate queries and statements from other programming languages (e.g., Python, R, Java, etc.).

As illustrated in FIG. 1, a user 101 provides a user input to the NL2SQL tool 104. The user input can be or can include a natural language utterance 102. The natural language utterance can be in text form, such as when the user types a sentence, a question, a text fragment, or phrase and provides it as an input to the NL2SQL tool 104 via client device(s) 103. The client devices(s) 103 can be configured to communicate with the NL2SQL tool 104, provide the natural language utterance 102 to the NL2SQL tool 104, and receive outputs from the NL2SQL tool 104. In some implementations, the natural language utterance 102 can be in speech form, which may be converted to text form and provided to the NL2SQL tool 104. As an example, a natural language utterance 102 such as 102*a* "Show me all the students who got an A in math" can be spoken by the user 101 and the NL2SQL tool 104 may be configured to translate the audio into text for further processing either in a standalone manner, via a plug-in, or by way of some other audio-to-text translator.

The NL2SQL tool 104 may be or may make use of one or more generative artificial intelligence models such as LLMs configured to generate a SQL query 106 (e.g., 106*a* or 106*b*) based on the natural language utterance 102. The NL2SQL tool 104 may receive a prompt including the natural language utterance 102 to generate a SQL query 106 that is relevant to the preferences of the user 101. In some implementations, the user 101 and/or client device 103 can generate a prompt including the natural language utterance 102 before providing the prompt to the NL2SQL tool 104. In other implementations, the NL2SQL tool 104 can receive the natural language utterance 102 and populate a prompt template before providing the prompt to a trained generative artificial intelligence model.

The NL2SQL tool 104 converts the natural language utterance 102 (as in example 1 depicted in FIG. 1) to the SQL query 106. The NL2SQL tool 104 may consider database schema information corresponding to one or more databases 108 when generating the SQL query 106. The SQL query 106 (as in Examples 2 or 3 depicted in FIG. 1) may be executed on the database(s) 108 to obtain a SQL result 110. As a non-limiting example, based on the generated SQL query 106, the SQL result 110 can be a list of students who got an A in math. The SQL result(s) 110 can be provided back to the user 101 by the NL2SQL tool 104. In some instances, the SQL result(s) 110 are reported back to the user 101 as raw output. In other instances, the SQL result(s) 110 are reported back to the user 101 as part of a natural language response (e.g., a summary) generated by the one or more generative artificial intelligence models in response to the natural language utterance 102. The user 101 may receive the SQL result(s) 110 through the client device (s) 103. Additionally or alternatively, the NL2SQL tool 104 may provide the SQL query 106 to the user(s) via some other means such as an email communication, SMS message, or another type of notification receivable on one or more other computing devices. In some implementations, the SQL query 106 is provided to the user(s) without running the SQL query 106 on the database(s) 108 to obtain SQL result(s) 110 (e.g., as part of a feedback request to validate the SQL query 106).

Figure 2:
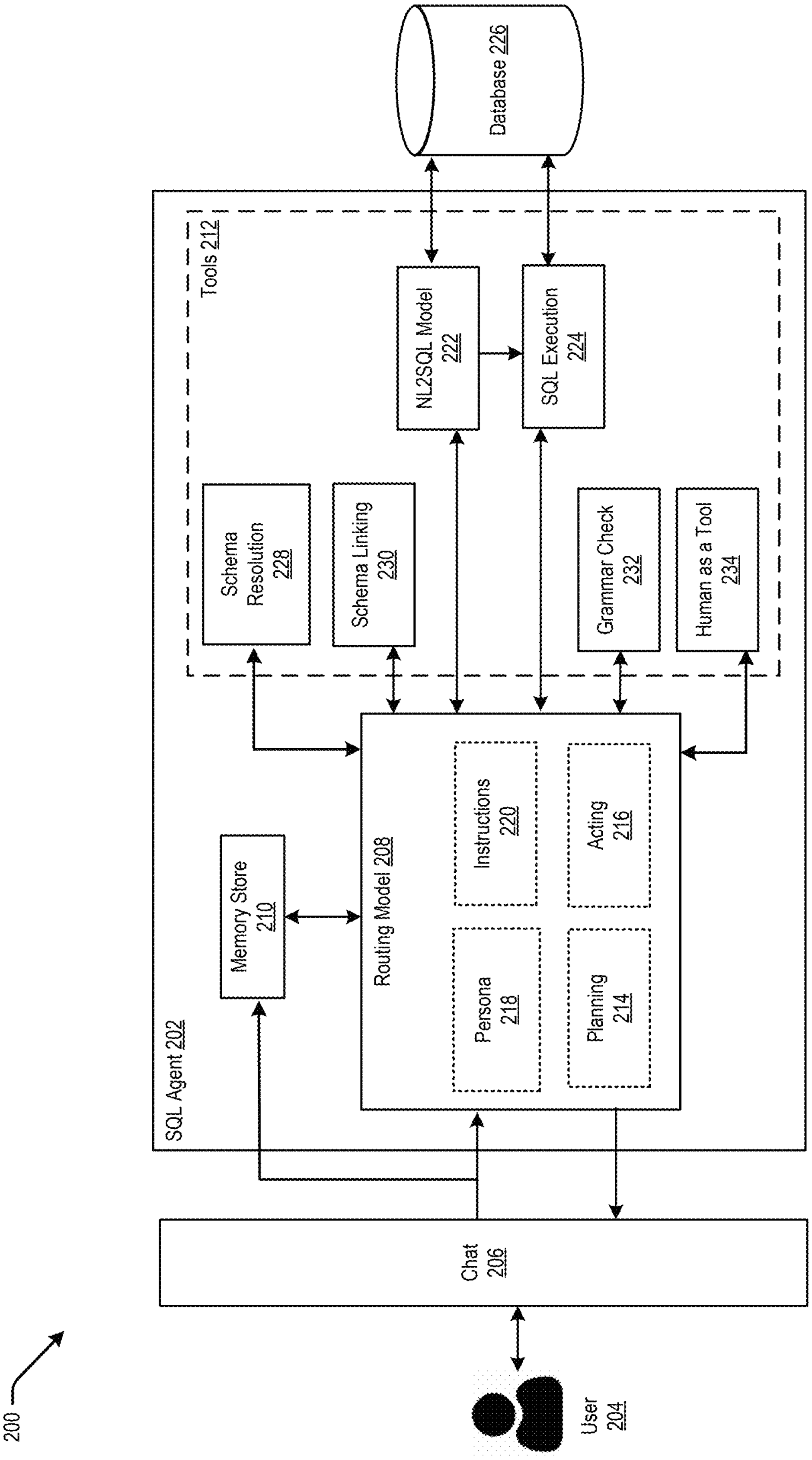
FIG. 2 is a simplified block diagram of a generative AI SQL agent according to certain embodiments.

FIG. 2 is a simplified block diagram of a SQL agent system 200 according to certain embodiments. The SQL agent system 200 is a computing system that can be implemented in software only, hardware only, firmware only, or a combination of hardware, software, and/or firmware. In certain embodiments, the SQL agent system 200 can be used to implement one or more tools related to SQL generation, execution, and/or review (e.g., NL2SQL tool 104 as described with respect to FIG. 1). The SQL agent system 200 can include a SQL agent 202 capable of converting a natural language question into a SQL query.

A user 204 can participate in a chat 206 with the SQL agent 202. The user 204 may participate in the chat 206 via a user interface such as a graphical user interface or a conversational user interface. As an example, the user 204 may provide input to the SQL agent 202 via a user interface element such as a chat window. The chat 206 can include one or more inputs from the user 204 and one or more responses from the SQL agent 202. The chat 206 may correspond to one or more chat sessions between the user 204 and the SQL agent 202. During the chat 206, the user 204 provides a natural language utterance that can be processed by the SQL agent 202. The natural language utterance can include a question related to a database or SQL generation.

One or more user inputs provided by the user 204 via the chat 206 are provided to the SQL agent 202. Included in the SQL agent 202 are a routing model 208, a memory store 210 and tools 212. The routing model 208 and memory store 210 receive user inputs such as natural language utterances from the chat 206. The memory store 210 can store a chat history for the user 204 and contextual information related to the user 204 and/or the chat 206. The tools 212 can include functions, APIs, and trained machine learning models that can be used by the SQL agent 202 to interact with external systems (e.g., a database 226, external knowledge bases) and/or generate SQL statements.

The routing model 208 may be or may make use of one or more generative artificial intelligence models such as LLMs. The routing model 208 can include a planning 214 component and an acting component 216. The planning component 214 can generate a plan that consists of a sequence of steps for execution and the acting component 216 can execute the steps in a generated plan using one or more of the tools 212. In some examples, the routing model 208 may retrieve contextual information related to the user 204 and/or chat 206 from the memory store 210 during planning by the planning component 214 to improve plan generation. Planning by the planning component 214 may further include determining a new plan based on a result produced by the acting component 216 upon execution of a previous plan.

One or more of the tools 212 supported by the SQL agent 202 may be LLM-based tools configured to receive a prompt and generate a result based at least in part on the prompt. As an example, the tools 212 can include an LLM-based NL2SQL model 222 that generates a SQL statement based on a prompt including a natural language utterance provided by the user 204 (e.g., as described in FIG. 1). The routing model 208 can generate a prompt based on a natural language utterance received from the user 204. In some examples, steps for generating a prompt can be included in a plan generated by planning component 214 and the prompt may be generated by the acting component 216. A prompt can include a persona 218 and instructions 220. The persona 218 can be selected from a set of available personas (see Table 1 for a non-limiting list of exemplary personas). Including the persona 218 in a prompt for an LLM may improve the accuracy of generated responses and customize responses generated by an LLM to the needs of the user 204. In some examples, the planning component 214 may select a tool from the tools 212 based on the persona 218.

TABLE 1

| Example Persona | Example Description |
|---|---|
| Junior Developer | A user having limited to no experience in writing SQL queries that requires assistance in writing and optimizing SQL queries. |
| Expert Developer | A user with several years of experience writing SQL queries. |
| Business Analyst | A user with strong context about the needs of a company and wants quick data insights without deep SQL knowledge. |
| Data Scientist | A user focused on extracting and analyzing data efficiently. |

The instructions 220 describe the knowledge bases and tools available to the SQL agent 202. The instructions 220 can be included in a prompt for LLM-based tools and may guide a tool to generate a response relevant to preferences of the user 204. Additionally, or alternatively, the prompt can include a table schema, description of columns in the table schema, context, in-context examples, additional instructions, a user question, or any combination thereof. In some examples, context may include contextual information related to the user 204 and/or chat 206 history and may be retrieved from the memory store 210 by the routing model

208. The prompt may further include database schema information corresponding to a database 226.

The routing model 208 may provide the generated prompt to a tool from the tools 212 selected by the planning component 214. As an example, the NL2SQL model 222 can receive a prompt provided by the routing model 208 and can generate a SQL query based on the prompt. The NL2SQL model 222 can be trained to convert a natural language question into a SQL query to help the user 204 complete data related tasks. In some examples, the SQL query generated by the NL2SQL model 222 is returned to the user 204 via the chat 206. Additionally, or alternatively, the generated SQL query can be provided to a SQL execution tool 224 that is configured to execute SQL queries on the database 226. The SQL execution tool 224 may receive the result of a SQL query from the database 226 and may provide the SQL result to the routing model 208. The routing model 208 may provide the SQL result to the user 204 via the chat 206. In some implementations, the routing model 208 may identify an error in the SQL result or determine the SQL query and/or result does not correspond to user 204 needs. In such a case, the routing model 208 can generate a new plan using the planning component 214 to correct the error or generate a new SQL query.

Additional examples of tools can include, but are not limited to, a schema resolution tool 228, a schema linking tool 230, a grammar check tool 232, and human as a tool 234. The schema resolution tool 228 may be configured to check for and/or fix any errors within a SQL statement. The SQL agent 202 may use the schema resolution tool 228 after a SQL query is generated by the NL2SQL model 222. The schema linking tool 230 may be configured to identify proper references to schema values (e.g., tables, columns, condition values) based on schema information and query patterns. The schema linking tool 230 can include content-based schema linking for mapping values, and name-based schema linking for mapping table and column names for SQL generation. For large schemas, retrieval augmented generation (RAG)-based schema linking may be implemented to retrieve a relevant subset of the schema. Schemas can be stored in a knowledge base (e.g., the memory store 210) and relevant schema information can be retrieved based on a natural language query provided by the user 204. In some implementations, the knowledge base can include external data stores and schema linking by the schema linking tool 230 can include performing a web search to identify relevant schema. The SQL agent 202 may be unable to resolve ambiguities during a schema linking operation by the schema linking tool 230. In such examples, the SQL agent 202 can ask the user 204 clarifying questions to resolve the ambiguities.

The grammar check tool 232 of the tools 212 can review grammar of generated statements. The human as a tool 234 aspect of the tools 212 involves the SQL agent 202 seeking human input for clarification and disambiguation, and may be used to supplement one or more additional tools of the set of tools 212. For example, use of the human as a tool 234 aspect of the tools 212 can include the SQL agent 202 asking the user 204, or another user such as a developer, for information that can be used to correct previously generated statements.

The SQL agent 202 may use a singular tool or a combination of the tools 212 to generate a response to the user 204. The routing model 208 can select a tool of the tools 212 and/or generate a prompt for the selected tool based on a natural language utterance received via the chat 206. The routing model 208 receives an output from the selected tool of the tools 212 based on the prompt and/or context provided to the selected tool. In some implementations, the output generated by the selected tool is provided to the user 204 via the chat 206 as received by the routing model 208 (i.e., without additional modifications to the output).

In some implementations, the routing model 208 responds to the user 204 who provided the original query as part of a two-way conversation (e.g., via chat 206). The natural language response may include a natural language component (e.g., answers to questions, information, etc.) and/or a logical form component (e.g., a SQL query). In some embodiments, the routing model 208 may generate a natural language response containing the output generated by the selected tool of the tools 212. The routing model 208 may be configured to generate the natural language response and/or may use a response generation tool to generate the natural language response. The natural language response can be provided to the user 204 via the chat 206. In some implementations, the SQL agent 202 may provide a visualization of the generated output through a plot, table, graph, and the like, via the chat 206. As one particular example, the SQL agent 202 can use the schema linking tool 230 to identify table and column names in a natural language utterance (which is an example of NL utterance 102 with respect to FIG. 1) provided by the user 204 and then generate a SQL query using the NL2SQL model 222 based on the identified table and column names. The SQL query may be provided to the user 204 via the chat 206 as generated by the NL2SQL model 222. In some implementations, the routing model 208 may generate a natural language response containing the SQL query and provide the natural language response to the user 204 via the chat 206.

Figure 3:
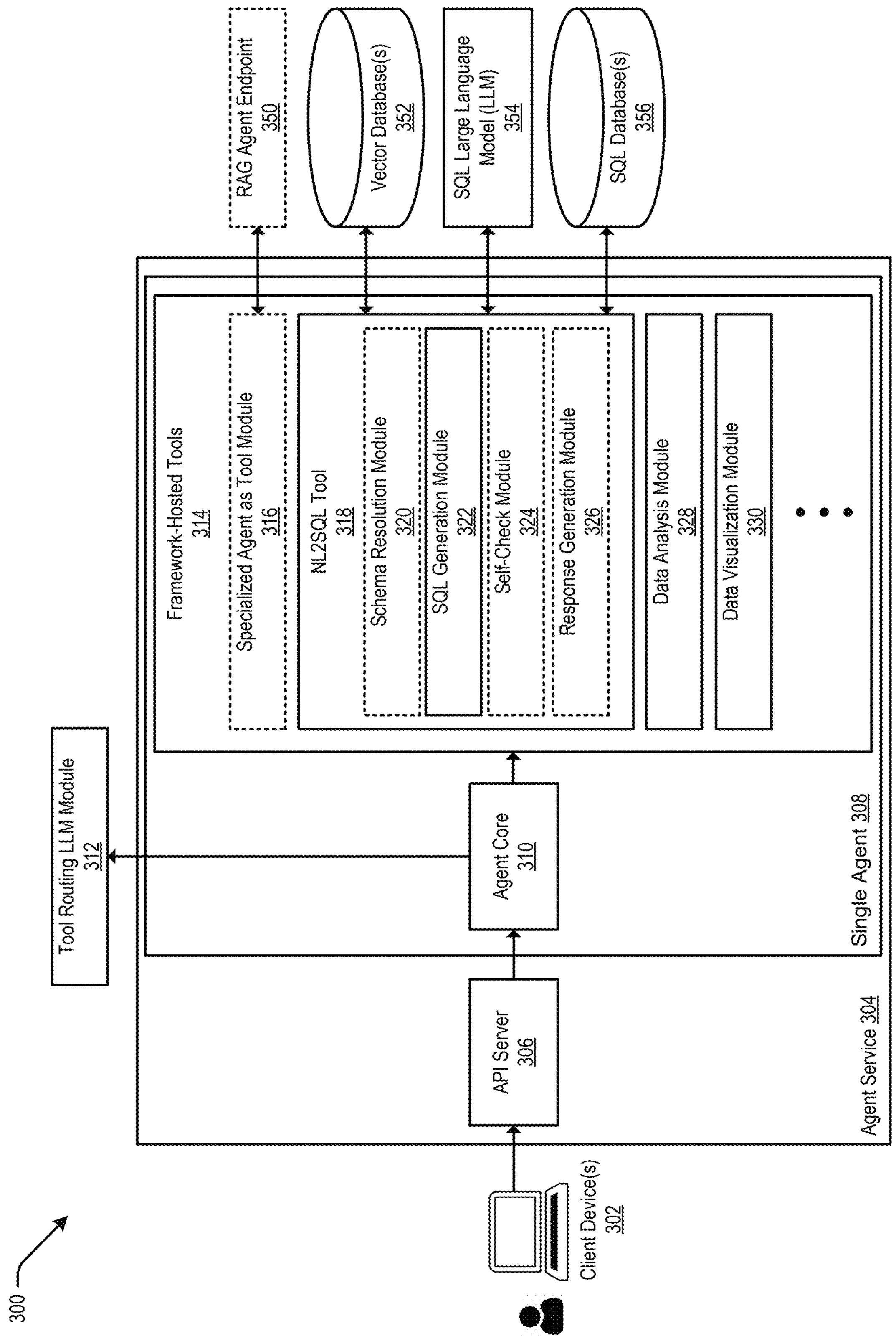
FIG. 3 is a simplified block diagram of a generative AI SQL agent according to certain embodiments.

FIG. 3 depicts a simplified diagram 300 for one example of a generative AI SQL agent, according to various embodiments. As discussed in regard to FIGS. 1 and 2, user(s) (e.g., users 101 or 204) may use client device(s) 302 to submit a natural language utterance and/or question to an agent service 304 by way of an API server 306. The API server 306 may be a software, hardware, and/or firmware component that enables one or more applications (e.g., cloud applications) to enable communication as an intermediary between the client device(s) 302 and the agents. The API server 306 may identify a specific agent (e.g., single agent 308), or multiple agents, to handle the instance (e.g., by agent specialty or user preference) and select an agent core 310. The agent core 310 may be configured with pass-through routing or, if additional tools are included in the agent, a specific routing (e.g., ReAct routing) may be implemented. The agent core 310 may handle multi-step (or iterated) SQL resolution, generation, and/or execution. By way of a non-limiting example, in analytical use cases using unique software packages (e.g., Oracle™ Analytics Cloud (OAC), Tableau™, etc.), a single analytical dashboard may generate multiple SQL queries using output from previous inputs (e.g., by way of Churn analysis, Funnel analysis, cohort analysis, etc.). The agent core 310 may access a tool routing LLM module 312 in order to identify, select, utilize, and/or train one or more LLM(s) that may suitably apply to the utterance received from the client device(s) 302.

The agent core 310 may include one or more framework-hosted tools 314 for addressing various functions. For example, the framework-hosted tools 314 may include a specialized agent as tool module 316 which may be in communication with a retrieval augmented generation (RAG) endpoint 350. The RAG endpoint 350 may improve an efficacy of one or more LLMs by suitably leveraging various sources of data. For example, retrieving data/documents relevant to the utterance (e.g., question, statement, task, etc.) and providing them as context for the LLM as either labeled or unlabeled data. The RAG endpoint 350 may provide support to the agent core and maintain up-to-date information based at least in part on other trained LLMs and/or agent cores (not depicted), and/or access domain-specific knowledge.

Included in the framework hosted tools 314 is a NL2SQL tool 318, which may be an example of the NL2SQL model 222 with respect to FIG. 2. The NL2SQL tool 318 can include, without limitation, a schema resolution module 320, a SQL generation module 322, a self-check module 324, and a response generation module 326. The schema resolution module 320 may function to receive input from the client device(s) 302 and request that the NL2SQL tool 318 check one or more schema for any errors (e.g., syntax errors, sematic errors, etc.) and fix the errors (or recommend a fix). The agent core 310 may provide explanations to the client device(s) 302 about each fix performed. The explanations may be provided in natural language. In some examples, the NL2SQL tool 318 may attempt to automatically resolve the errors if possible and ask clarification questions (e.g., as output to the client device(s) 302) where suitably needed. If the error cannot be resolved, the error may be displayed to the user(s). The agent core 310 (which may be an example component of SQL agent 202 with respect to FIG. 2) may return the different types of errors. For example, the agent core 310 can return syntax errors and semantic errors.

The schema resolution module 320 may reference one or more vector database(s) 352 to obtain and/or store schema. The SQL generation module 322 may take the utterance received from the client device(s) 302 and construct a SQL query. To do this, the NL2SQL tool 318 may access one or more generative artificial intelligence models such as LLMs (e.g., SQL LLM 354) that may have been previously trained to generate SQL queries. The LLM may receive the utterance from the NL2SQL tool 318 and may translate the utterance into a relevant SQL query. The SQL generation module 322 may then pass the received SQL query from the LLM to one or more additional modules. For example, the SQL generation module 322 may pass the SQL query returned from the LLM to a response generation module 326. The response generation module 326 may append the SQL query (optionally along with information related to the utterance) and return the SQL query to the client device(s) 302. In addition, or alternatively, the response generation module 326 may pass the SQL query to one or more SQL database(s) 356 to retrieve information related to the utterance. The NL2SQL tool 318 may utilize a self-check module 324, which may function with any one or more of the other modules. The self-check module 324 may automatically attempt to resolve errors associated with the SQL query and/or LLM prompt containing the utterance. The self-check module 324 may pose clarifying questions to the client device(s) 302 and/or the LLM to resolve the errors.

The framework-hosted tools 314 can also include a data analysis module 328 and a data visualization module 330. Each of the data analysis module 328 and the data visualization module 330 may function with any of the other modules of the framework-hosted tools 314 in order to analyze various analytics and display the various analytics. The analytics may include analyses of schema, SQL queries, LLM accuracy, recommendations, or suitable equivalents.

Figure 4:
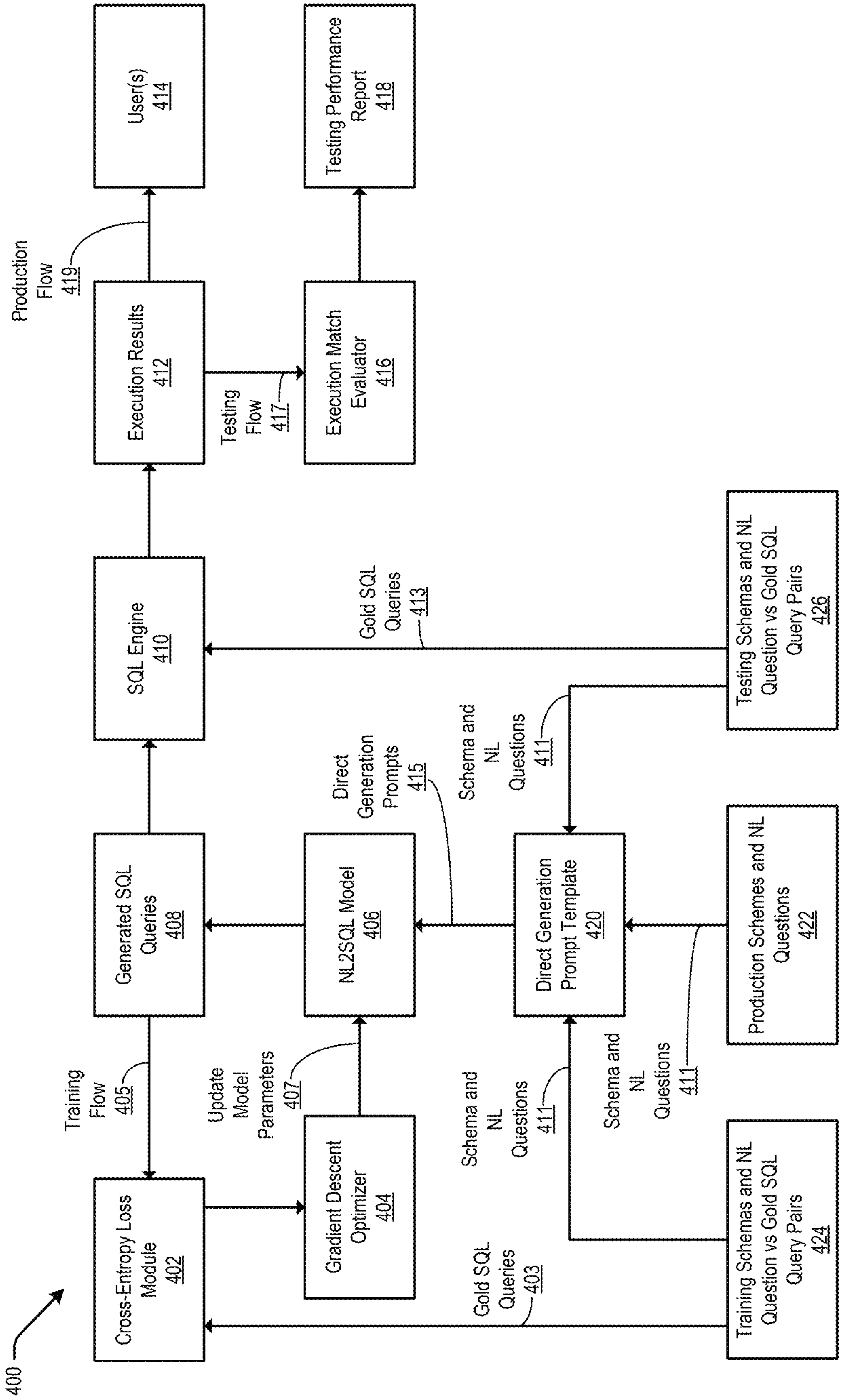
FIG. 4 is a simplified block diagram for training, testing, and producing a natural language-to-query language model according to certain embodiments.

FIG. 4 depicts a simplified block diagram 400 for training, testing, and deployment or production of a Natural Language-to-SQL (NL2SQL) model 406, according to various embodiments. This simplified overview of training, testing, and inference depicts flows for a NL2SQL direct generation model (however it should be understood that similar steps could be implemented for a generation model that translates to an intermediate database query language which can be used to generate a query in a specific system query language). The NL2SQL model 406 is powered by a machine learning model (e.g., a LLM) configured to convert a natural language (NL) utterance (e.g., a query posed by a user using an agent) into a logical form, for example, an intermediate database query language such as OMRL or a system query language format, such as SQL or PGQL. If an intermediate database query language format is used then the intermediate database query language can be used to generate a query in a specific system query language (e.g., SQL), which can then be executed for querying a system such as a database to obtain an answer (response) to a user utterance. If a system query language format is used, then the system query language can be directly executed for querying a system such as a database to obtain an answer to a user utterance.

One goal of the NL2SQL model 406 is to allow end users to interact with their systems, (e.g., SQL databases) through natural language rather than program specific language queries such as SQL queries. Using a NL2SQL service, users such as business analysts can extract information from their systems without thorough knowledge of a specific programming language and system schemas. In this example, the NL2SQL model 406 is an LLM, which is an advanced type of artificial intelligence model designed to understand and generate human language. These models are trained on vast amounts of text data and leverage deep learning techniques to perform a variety of natural language processing tasks, such as text generation, translation, summarization, and answering questions. In the below description, the LLM (NL2SQL model) 406 is designed and trained to convert natural language queries into SQL queries. This involves understanding the semantics of the natural language input, mapping it to the corresponding database schema, and generating a syntactically and semantically correct SQL query that can retrieve the desired information from the database. However, it should be understood that similar techniques could be implemented for other system query languages such as PGQL and/or other intermediate logical forms such as MRL or OMRL.

The input to the NL2SQL model 406 is a natural language question.

For example:

"Get me the list of employees from Australia."

The main output from the NL2SQL model is a SQL query 408.

For example:

```
SELECT employee_id, employee_name FROM
  Employee WHERE country="Australia".
```

Another important input to the NL2SQL model 406 is the database schema that helps the model to identify relevant tables and columns in the SQL output construction.

For example:

```
CREATE TABLE Employee (
  employee_id TEXT(12) NOT NULL,
  employee_name TEXT(100) NOT NULL,
  birth_date DATE NOT NULL,
  hire_date DATE NOT NULL,
  country TEXT(100),
  . . .
  )
```

```
CREATE TABLE JobTitle(
  . . .
)
. . .
```

As described herein, the NL2SQL model 406 is a pre-trained NL2SQL model developed based on instruction fine-tuning of LLMs to provide this NL2SQL direct generation capability, e.g., the mapping of (Database Schema, NL Question)→SQL Query. Below is the summary of how the NL2SQL direct generation capability is implemented via instruction fine-tuning.

The data used to train the NL2SQL model 406 can include multiple database schemas defined as SQL CREATE TABLE statements:

- Table names
- Column names and types
- Primary and foreign keys
- Other constraints The following is one example of a database schema:

```
CREATE TABLE aircraft (
  aid NUMERIC(9, 0),
  name TEXT(30),
  distance NUMERIC(6, 0),
  PRIMARY KEY (aid))
)
CREATE TABLE employee (
  eid NUMERIC(9, 0),
  name TEXT(30),
  salary NUMERIC(10, 2),
  PRIMARY KEY (eid)
)
CREATE TABLE certificate (eid
  NUMERIC(9, 0),
  aid NUMERIC(9, 0),
  PRIMARY KEY (eid, aid),
  FOREIGN KEY (aid) REFERENCES aircraft (aid),
  FOREIGN KEY (eid) REFERENCES employee (eid)
)
CREATE TABLE flight (
  flno NUMERIC(4, 0),
  origin TEXT(20),
  destination TEXT(20),
  distance NUMERIC(6, 0),
  departure_date DATE,
  arrival_date DATE,
  price NUMERIC(7, 2),
  aid NUMERIC(9, 0),
  PRIMARY KEY (flno),
  FOREIGN KEY (aid) REFERENCES aircraft (aid)
)
```

Each database schema can be associated with multiple pairs of natural language questions and corresponding SQL queries.

The following is one example of a NL Question and a corresponding SQL Query:

NL Question: "What is the name of the employee with salary greater than 100000 and with the most certificates to fly planes more than 5000?"

SQL Query: "SELECT T1.name FROM employee AS T1 JOIN certificate AS T2 ON T1.eid=T2.eid JOIN aircraft AS T3 ON T2.aid=T3.aid WHERE T3.distance >5000 AND T1.salary >100000 GROUP BY T1.eid ORDER BY count(*) DESC LIMIT 1"

Each question-query pair and its corresponding database schema are populated following a NL2SQL direct generation prompt template to create one direct generation prompt.

The following is one example of a direction NL2SQL generation prompt:

Given an input Question, create a syntactically correct Oracle SQL query to run.

Pay attention to using only the column names that you can see in the schema description.

Be careful to not query for columns that do not exist. Also, pay attention to which column is in which table.

Please double check the SQL query you generate.

DO NOT use alias in the SELECT clauses.

Only use the tables listed below.

```
CREATE TABLE aircraft (
  aid NUMERIC(9, 0),
  name TEXT(30),
  distance NUMERIC(6, 0),
  PRIMARY KEY (aid)
)
CREATE TABLE employee (
  eid NUMERIC(9, 0),
  name TEXT(30),
  salary NUMERIC(10, 2),
  PRIMARY KEY (eid)
)
CREATE TABLE certificate (
  eid NUMERIC(9, 0),
  aid NUMERIC(9, 0),
  PRIMARY KEY (eid, aid),
  FOREIGN KEY(aid) REFERENCES aircraft (aid),
  FOREIGN KEY(eid) REFERENCES employee (eid)
)
CREATE TABLE flight (
  flno NUMERIC(4, 0),
  origin TEXT(20),
  destination TEXT(20),
  distance NUMERIC(6, 0),
  departure_date DATE,
  arrival_date DATE,
  price NUMERIC(7, 2),
  aid NUMERIC(9, 0),
  PRIMARY KEY (flno),
  FOREIGN KEY (aid) REFERENCES aircraft (aid)
)
```

Question: What is the name of the employee with salary greater than 100000 and with the most certificates to fly planes more than 5000?

SQL: "SELECT T1.name FROM employee AS T1 JOIN certificate AS T2 ON T1.eid=

T2.eid JOIN aircraft AS T3 ON T2.aid=T3.aid WHERE T3.distance>5000 AND

T1.salary>100000 GROUP BY T1.eid ORDER BY count (*) DESC LIMIT 1"

The prompt example can then be sent to the LLM model to generate the SQL query during training and testing phases. The gold (ground truth) SQL Query: "SELECT T1.name FROM employee AS T1 JOIN certificate AS T2 ON T1.eid=T2.eid JOIN aircraft AS T3 ON T2.aid=T3.aid WHERE T3.distance>5000 AND T1.salary>100000 GROUP BY T1.eid ORDER BY count(*) DESC LIMIT 1" may be used to evaluate the generated SQL query using a loss function such as cross-entropy loss (e.g., using cross-entropy loss module at block 402) in training and a performance metric such as execution match in testing. For execution match, both gold and generated SQL queries are executed on the database using the SQL engine. The result sets of the executed gold and generated SQL queries are compared to check if they are matched.

As illustrated in FIG. 4, the training and testing flows can start at either a training schemas and NL question versus (vs) gold SQL query pairs block 424 or a testing schemas and NL question versus gold SQL query pairs block 426, respectively, where training and testing data is collected (e.g., acquired or accessed). The data collection can include exploring various data sources such as public datasets, private data collections, or real-time data streams, depending on the needs of a given project. In some instances, a data source is a public or online repository of information or examples pertinent to a general or target domain space. Many domains have publicly available datasets provided by governments, universities, or organizations. For example, many government and private entities offer datasets on healthcare, environmental data, and more through various portals. For proprietary needs, data might instead be available through partnerships or purchases from private companies that specialize in data aggregation. In other instances, a data source is a private repository of information or examples pertinent to a general or target domain space. For example, a data source can be a storage device that stores various schemas and natural language questions (including labels for corresponding gold SQL queries 403, 413).

Preprocessing may be performed on the training and testing data (from blocks 424, 426, respectively), and may serve as a bridge between raw data acquisition and effective model training. The primary objective of preprocessing is to transform raw data into a format that is more suitable and efficient for analysis, ensuring that the data input into machine learning algorithms is clean, consistent, and relevant. This step can be useful because raw data often comes with a variety of issues such as missing values, noise, irrelevant information, and inconsistencies that can significantly hinder the performance of a model. By standardizing and cleaning the data beforehand, preprocessing helps to enhance the accuracy and efficiency of the subsequent analysis, making the data more representative of the underlying problem the model aims to solve. At block 420, the preprocessing includes populating a direct generation prompt template (as described above) with the training and testing data (e.g., schema and NL questions 411) to create direct generation prompts 415 from which the NL2SQL model 406 generates SQL queries.

Once collected, generated, preprocessed, and/or labeled, the data may then be split into the training and testing datasets. The training and testing datasets may comprise the raw data and/or preprocessed data. The training and testing datasets are typically split into at least three subsets of data: training, validation, and testing. The training subset of data is used to fit the model, where the machine learning model learns to make inferences based on the training data. The validation subset of data, on the other hand, is utilized to tune hyperparameters and prevent overfitting by providing a sandbox for model selection. Finally, the test subset of data serves as a new and unseen dataset for the model, and can be used to simulate real-world application and to evaluate the performance of the final model. The process of splitting the training and testing datasets ensures that the model can perform well not just on the data it was trained on, but also on new, unseen data, thereby validating and testing the ability of the model to generalize.

Various techniques can be employed to split the training and testing datasets effectively, with each method aiming to maintain a good representation of the overall dataset in each subset. A simple random split (e.g., a 70%/20%/10%, 80%/10%/10%, or 60%/25%/15%) is the most straightforward approach, where examples from the data are randomly assigned to each of the three sets. However, more sophisticated methods may be used to preserve the underlying distribution of data. For instance, stratified sampling may be used to ensure that each split reflects the overall distribution of a specific variable, which may be particularly useful in cases where certain categories or outcomes are underrepresented. Another technique, k-fold cross-validation, involves rotating the validation set across different subsets of the data, thereby maximizing the use of available data for training while still holding out portions for validation. These methods can help to achieve more robust and reliable model evaluation and are useful in the development of predictive models that perform consistently across varied datasets.

At this stage, hyperparameters may also be acquired or set for the training and testing. The hyperparameters control the overall behavior of the models. Unlike model parameters that are learned automatically during training, hyperparameters are set before training begins and have a significant impact on the performance of the model. For example, in the case of an LLM, hyperparameters can include the learning rate, batch size, number of layers, number of attention heads, hidden layer size, dropout rate, weight decay, sequence length, and embedding dimension, among others. These settings can determine how quickly a model learns, its capacity to generalize from training data to unseen data, and its overall complexity. Correctly setting hyperparameters is important because inappropriate values can lead to models that underfit or overfit the data. Underfitting occurs when a model is too simple to learn the underlying pattern of the data. Overfitting happens when a model is too complex, learning the noise in the training data as if it were signal.

As shown in FIG. 4, the direct generation prompts 215 (for the training and testing data) from block 420 are input into the NL2SQL model 406 via a training and testing subsystem for training and/or testing. The training and testing subsystem may be comprised of a combination of specialized hardware and software to efficiently handle the computational demands required for training, validating, and testing a machine learning model. On the hardware side, high-performance GPUs (Graphics Processing Units) may be used for their ability to perform parallel processing, drastically speeding up the training of complex models, especially deep learning networks. CPUs (Central Processing Units), while generally slower for this task, may also be used for less complex model training or when parallel processing is less critical. TPUs (Tensor Processing Units), designed specifically for tensor calculations, provide another level of optimization for machine learning tasks. On the software side, a variety of frameworks and libraries may be utilized, including TensorFlow, PyTorch, Keras, and scikit-learn. These tools offer comprehensive libraries and functions that facilitate the design, training, validation, and testing of a wide range of machine learning models across different computing platforms, whether local machines, cloud-based systems, or hybrid setups, enabling developers to focus more on model architecture and less on underlying computational details.

Training is the initial phase of developing machine learning models such as the NL2SQL model 406, where the model learns to generate SQL queries 408 based on the training data (e.g., training flow 405) provided from the training datasets. During this phase, the model iteratively adjusts its internal model parameters to achieve a preset optimization condition. For example, by utilizing a cross-entropy loss module at block 402 and a gradient descent optimizer at block 404, the preset optimization condition can be achieved by minimizing the difference between the model output (e.g., generated SQL queries) and the ground truth labels (e.g., gold SQL queries) in the training data. In some instances, the preset optimization condition can be achieved when the preset fixed number of iterations or epochs (full passes through the training dataset) is reached. In some instances, the preset optimization condition is achieved when the performance on the validation dataset stops improving or starts to degrade. In some instances, the preset optimization condition is achieved when a convergence criterion is met, such as when the change in the model parameters falls below a certain threshold between iterations. This process, known as fitting, is fundamental because it directly influences the accuracy and effectiveness of the model.

In an exemplary training phase performed by the training and testing subsystem, the training subset of data is input into the machine learning algorithms to find a set of model parameters (e.g., weights, coefficients, trees, feature importance, and/or biases) that minimizes or maximizes an objective function (e.g., a loss function, a cost function, a contrastive loss function, a cross-entropy loss function, etc.). To train the machine learning algorithms to achieve accurate predictions, "errors" (e.g., a difference between a predicted label and the ground truth label) need to be minimized. In order to minimize the errors (e.g., via blocks 402 and 404), the model parameters 407 can be configured to be incrementally updated by minimizing the objective function over the training phase ("optimization"). Various different techniques (e.g., stochastic gradient descent) may be used to perform the optimization. For example, to train machine learning algorithms such as an LLM, optimization can be done using back propagation. The current error is typically propagated backwards to a previous layer, where it is used to modify the weights and bias in such a way that the error is minimized. The weights are modified using the optimization function. Other techniques such as random feedback, Direct Feedback Alignment (DFA), Indirect Feedback Alignment (IFA), Hebbian learning, and the like can also be used to update the model parameters in a manner as to minimize or maximize an objective function. This cycle can be repeated until a desired state (e.g., a predetermined minimum value of the objective function) is reached.

Validating is another phase of training where the model is checked for deficiencies in performance and the hyperparameters are optimized based on validation data provided from the training datasets. The validation data helps to evaluate the performance of the model, such as accuracy, precision, recall, or F1-score, to gauge how well the model is likely to perform in real-world scenarios. Hyperparameter optimization, on the other hand, involves adjusting the settings that govern the learning process of the model (e.g., learning rate, number of layers, size of the layers in neural networks) to find the combination that yields the best performance on the validation data. One optimization technique is grid search, where a set of predefined hyperparameter values are systematically evaluated. The model is trained with each combination of these values, and the combination that produces the best performance on the validation set is chosen. Although thorough, grid search can be computationally expensive and impractical when the hyperparameter space is large. A more efficient alternative optimization technique is random search, which samples hyperparameter combinations from a defined distribution randomly. This approach can in some instances find a good combination of hyperparameter values faster than grid search. Advanced methods like Bayesian optimization, genetic algorithms, and gradient-based optimization may also be used to find optimal hyperparameters more effectively. These techniques model the hyperparameter space and use statistical methods to intelligently explore the space, seeking hyperparameters that yield improvements in model performance.

Once a machine learning model has been trained and validated, it undergoes a final evaluation using the subset of test data that was extracted from the training and testing datasets and has not been used during the training or validation phases. The evaluation step can provide an unbiased assessment of model performance in simulating a production operation. The subset of test data serves as new, unseen data for the model, mimicking how the model would perform when deployed in actual use. During testing, SQL queries 408 generated by the NL2SQL model 406 can be compared against the true values (e.g., gold SQL queries) in the subset of test data using various performance metrics such as accuracy, precision, recall, and mean squared error, depending on the nature of the problem. As represented in FIG. 4, the gold and generated SQL queries can additionally, or alternatively be executed on a corresponding database using a SQL engine 410 (execution engine; see below in Production Flow section for detailed description) to obtain execution results 412. At block 416, the result sets (e.g, testing flow 417) from executing the gold and generated SQL queries can be compared using an execution match evaluator to compute accuracy execution match metrics. This process helps to verify the generalizability of the model—i.e., the ability of the model to perform well across different data samples and environments—which can highlight potential issues like overfitting or underfitting and ensure that the model is robust and reliable for practical applications. The NL2SQL model 406 is fully validated and tested once the outputs have been reported (e.g., testing performance has been reported) and deemed acceptable by user defined acceptance parameters at block 418. Acceptance parameters may be determined using correlation techniques such as, for example, the Bland-Altman method, using the Spearman's rank correlation coefficients, and calculating performance metrics such as the error, accuracy, precision, recall, receiver operating characteristic curve (ROC), etc.

As shown in FIG. 4, according to this training, testing, and deployment example, the production flow starts at block 422 where production schemas and natural language utterances (real-world input data) arc input from the direct generation prompt template into the NL2SQL model 406 via a production subsystem for inference. The production subsystem may be comprised of various components for deploying machine learning models such as the NL2SQL model 406 in a production environment. In some instances, the NL2SQL model 406 can be a component of a larger system or service (e.g., used with an agent as described with respect to FIGS. 1-3). In some instances, the NL2SQL model 406 and/or the inferences can be used by downstream applications to provide further information. For example, the inferences can be used to hold a conversation with a user as part of an agent or can be used to provide data analysis to a user via an analytical service such as a cloud-based analytics service. Deploying the NL2SQL model 406 includes moving the model(s) from a development environment (e.g., the training and testing subsystem, where it has been trained, validated, and tested), into a production environment where it can make inferences on real-world data (e.g., input data). This step typically starts with the model being saved after training, including its parameters and configuration such as final architecture and hyperparameters. The model is then converted, if necessary, into a format that is suitable for deployment, depending on the deployment environment. For instance, a model trained in a developmental computing environment such as Python might be converted into a Java-friendly format for integration into a larger enterprise application. Deployment can be conducted on various platforms, including on-premises servers or cloud environments like OCI, AWS, Azure, Google, etc. (see below discussion of various computer and cloud architectures with respect to FIGS. 11-15).

At block 420, the input data (e.g., production schemas and natural language utterances) are used to populate the direct generation prompt template (as described above) to create direct generation prompts from which the NL2SQL model 406 generates SQL queries 408. The direct generation prompts can be input at 415 into the NL2SQL model 406 via the production subsystem for inference. The NL2SQL model 406 then translates the natural language utterance into a SQL query 408. As part of the translation process, the NL2SQL model 406 may first parse the natural language utterance to understand the intent of the user. The parsing may involve identifying the key components of the request, such as the desired action (e.g., SELECT, UPDATE), the entities involved (e.g., tables, columns), and any conditions or filters. For example, if the user says, "Show me all the customers who signed up in the last month," the NL2SQL model 406 identifies the action (retrieve data), the entities (customers), and the condition (signed up in the last month). The NL2SQL model 406 then maps the identified entities and conditions to the corresponding elements in the schema (e.g., database schema). This step requires knowledge of the database structure, including table names, column names, and data types (which is included within the direct generation prompt template). Continuing with the example, the NL2SQL model 406 needs to understand that "customers" refers to a specific table, and "signed up" corresponds to a column (e.g., 'signup_date') in that table. Using the parsed intent and mapped schema elements, the NL2SQL model 406 constructs a syntactically correct SQL query 408. This involves selecting the appropriate SQL keywords and structuring the query according to SQL syntax rules. For the example request, the LLM would generate the following SQL query:

```
"sql
SELECT*FROM customers WHERE
  signup_date>=DATE_SUB(CURDATE( ), INTER-
  VAL 1 MONTH);
"
```

The NL2SQL model 406 may then validate the constructed SQL query 408 to ensure it aligns with the intent of the user and adheres to the database schema. This could involve checking for syntax errors, ensuring the correct use of SQL functions, and verifying the query against the schema. If necessary, the NL2SQL model 406 refines the query to better match the user request and/or to correct any identified issues. This step might also involve asking the user for clarification if the original utterance was ambiguous. Once generated and optionally validated, the NL2SQL model 406 outputs the SQL queries 408.

The SQL queries can then be executed on the corresponding database using the SQL engine (execution engine) 410 to obtain execution results 412. The execution engine can execute the SQL queries on the database by following a multi-step process that involves parsing, optimizing, and executing the query. Initially, an SQL query is parsed to create an internal representation, typically an Abstract Syntax Tree (AST), which outlines the structure of the query. The SQL engine can then consult the database schema to validate the query, ensuring that all referenced tables, columns, and data types exist and are correctly used. Once validated, the query undergoes optimization, where the execution engine determines the most efficient way to access and manipulate the data, often through the use of query optimization techniques such as indexing, JOIN algorithms, and query rewriting. This step aims to minimize resource usage and execution time. Finally, the optimized query is executed against the database. The execution engine processes the query plan, retrieves the required data from the storage engine, and applies any necessary transformations, such as filtering, sorting, or aggregating. The resulting data is then formatted and returned to the user (or user(s)) 414 by way of a production flow 419 or application that issued the query, which completes the process of data retrieval.

To manage and maintain its performance, a deployed model such as the NL2SQL model 406 may be continuously monitored to ensure it performs as expected over time. This involves tracking the inference accuracy of the model, response times, and other operational metrics. Additionally, the model may require retraining or updates based on new data or changing conditions in the environment to which it is applied. Retraining or updates can be useful tools, as machine learning models can drift over time due to changes in the underlying data on which they are making predictions-a phenomenon known as model drift. Therefore, maintaining a machine learning model in a production environment often involves setting up mechanisms for performance monitoring, regular evaluations against new test data, and potentially periodic updates and retraining of the model to ensure it remains effective and accurate in making predictions.

Preference Alignment Training For Finetuning A Language Model

Language models (LMs) such as LLMs used for NL-to-query language tasks (e.g., NL2SQL tasks) often have a large, fixed vocabulary of tokens, and due in part to the size of these vocabularies, can hallucinate (i.e., produce erroneous content) and may not be robust to different kinds of input. Various techniques can be utilized in an attempt to reduce LM hallucinations, increase robustness, and boost overall performance. For example, one-shot prompting, few-shot prompting, context injection, grounding, and prompt augmentation may improve the LM's NL-to-query language performance by guiding the LM's output. Supervised finetuning (SFT) can also be used to condition the LM's output by finetuning the LM using data specific to a given NL-to-query language task. However, the probability distribution for the next token in an output sequence of tokens generated by the LM is still based on the large, fixed vocabulary. Further, known SFT techniques use only positive data where each data point includes, for example, an input prompt comprising an instruction, a database schema, a user question, and an executable query language statement (i.e., a query language statement that retrieves the correct data needed to answer the user question). As a result, a LM subjected to SFT has may still be prone to generating incorrect (non-executable) query language statements given that there are typically other ways to write a query language statement for a given user question other than the way associated with the executable query language statement provided in the SFT data and the LM has no familiarity with non-executable query language statements. Thus, even after employing such techniques to enhance performance, a LM performing NL-to-query language tasks will often return less than desirable or outright incorrect query language statements, and may still struggle with complex JOIN statements, date/time handling with absolute and relative dates, aggregation robustness with business logic, value matching, and/or other query language functions required to generate correct query language statements in some cases. As such, queries executed on databases using LM-generated query language statements often result in erroneous query execution, failed data retrieval, and decreased query accuracy.

The techniques described herein overcome these challenges and others by providing a unique pipeline by which preference alignment training (PAT) data can be automatically curated and subsequently used to train (e.g., finetune) a machine-learning model in a manner that targets the NL-to-query language weaknesses of the machine-learning model and improves the quality of query language statements generated by the machine-learning model in response to natural language questions. Each data point of the PAT data intentionally includes both a correct/executable query language statement and an incorrect/non-executable query language statement for the user question associated with the data point. Consequently, finetuning a machine-learning model using the curated PAT data can generate a finetuned machine-learning model that can generate more query language statements similar to the correct/executable query language statements present in the PAT data while minimizing/avoiding the generation of query language statements that are similar to the incorrect/non-executable query language statements present in the PAT data. As described in more detail below, the techniques described herein can employ both execution-based PAT data generation and LLM-generated PAT data generation, and may employ filtering and scoring techniques to produce an optimized PAT dataset for finetuning machine-learning models used to perform NL-to-query language tasks.

While the techniques described herein may, at least in some examples, be described with particular reference to natural language-to-SQL (NL2SQL) tasks, it should be understood that the techniques described herein are applicable to the conversion of natural language to query language statements other than SQL. Additionally, with minimal changes, the techniques described herein may be adapted for use in other comparable domains such as, without limitation, text-to-code domains. In some instances, the techniques described herein can be implemented in an agent system, as described with respect to FIG. 2. The techniques described herein are also applicable to other artificial intelligence-based systems that include one or more LLMs.

Figure 5:
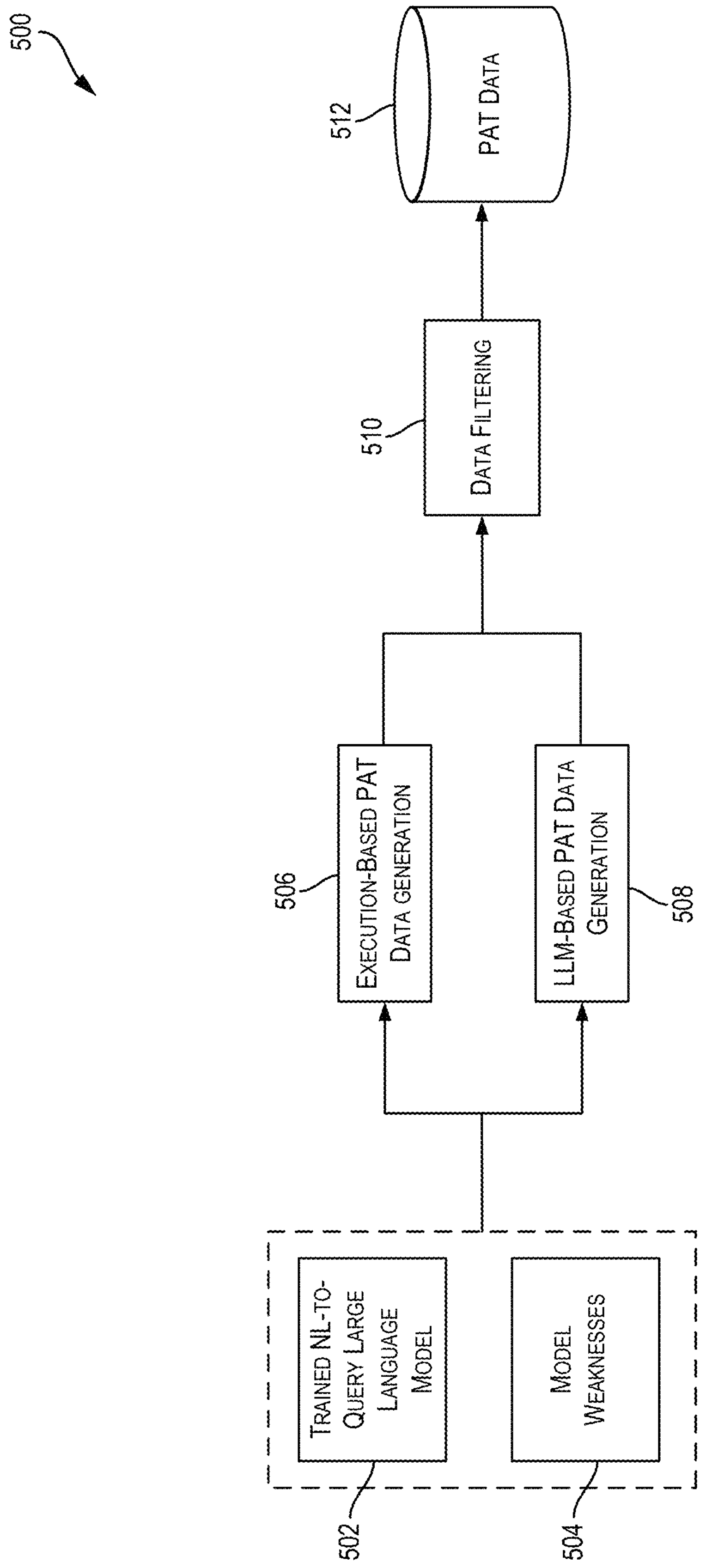
FIG. 5 is depicts a pipeline for automatically curating preference alignment training data for subsequent use in finetuning a language model used to perform natural language-to-query language tasks according to certain embodiments.

FIG. 5 depicts one example of a pipeline 500 for automatically curating preference alignment training (PAT) data for subsequent use in improving the ability of a LM used to perform NL-to-query language tasks in a manner that targets the LM's weaknesses and improves the quality of SQL statements generated by the LM in response to natural language questions. As mentioned above, common weaknesses of a LM trained to generate query language statements in response to natural language inputs may include, for example, handling complex JOIN statements, date/time handling with absolute and relative dates, aggregation robustness with business logic, and value matching. With respect to JOIN statements, for example, a LM may struggle in several ways. For example, when attempting to perform complex JOIN statements, the LM may hallucinate a primary key (PK)/foreign key (FK) pair, may suffer from COUNT aggregation confusion, attribute confusion, and/or table confusion. In the case of hallucinating a PK/FK pair, for example, the LM may not assign the FK column to the correct table in situations with multiple JOINs with aliases or may confuse the PK and FK names. In the case of JOIN+COUNT aggregation confusion, for example, the LM may pick the wrong attribute for COUNT( ) or skip COUNT( ) altogether in examples having complex queries with one or more JOINS. In the case of JOIN+attribute confusion, for example, the LM may pick the wrong attribute (especially where value mentions are more implicit in the NL question) or may assign values to the wrong attribute when there are similar or confusing attributes. In the case of JOIN+table confusion, for example, the LM may pick the wrong entity altogether. Other JOIN errors are also possible.

The pipeline 500 of FIG. 5 enables the generation of automated PAT data with minimal human input. This is in contrast to traditional methods of data curation for preference alignment training, where the bulk of the PAT data needs to be annotated by humans. The pipeline 500 may leverage one or more trained models such as a NL-to-query language model 502 and may be guided by a selected weakness 504 (e.g., complex JOINs) of the LM model for which improvement is sought. The one or more NL-to-query language model(s) 502 may be LLMs, such as LLMs trained to perform NL2SQL tasks. The pipeline 500 may employ execution-based PAT data generation 506 in combination with LLM-based PAT data generation 508 and data filtering 510 to generate PAT data 512 that can then be used to finetune a target LM in a manner that improves the LM's selected weakness. At a high level, the execution-based PAT data generation 506 generates incorrect query language statements for natural language queries of an existing training dataset and adds the incorrect query language statements to other data of the training dataset to produce a first PAT dataset. The LLM-based PAT data generation 508 generates synthetic natural language queries based on database schemas in the training dataset and uses the synthetic natural language queries to thereafter predict both executable (correct) and non-executable (incorrect) query language statements for the synthetic natural language queries. The synthetic natural language queries, the executable synthetic query language statements, and the non-executable synthetic query language statements are used to form a plurality of synthetic data points that are used to populate a second PAT dataset.

The first PAT dataset and the second preference alignment training dataset may be combined to generate a preference alignment training dataset for finetuning LM models to perform NL-to-query language tasks. The data filtering 510 can be applied to both the first PAT dataset and the second PAT dataset. The data filtering 510 may be multi-stage data filtering. The multi-stage data filtering may involve the use of one or more other LLMs that may be used to evaluate the quality of the correct and incorrect query language statements. The PAT data 512 may comprise data points from the first PAT dataset and the second PAT dataset that are identified/selected for inclusion therein as a result of the data filtering 510.

Figure 6:
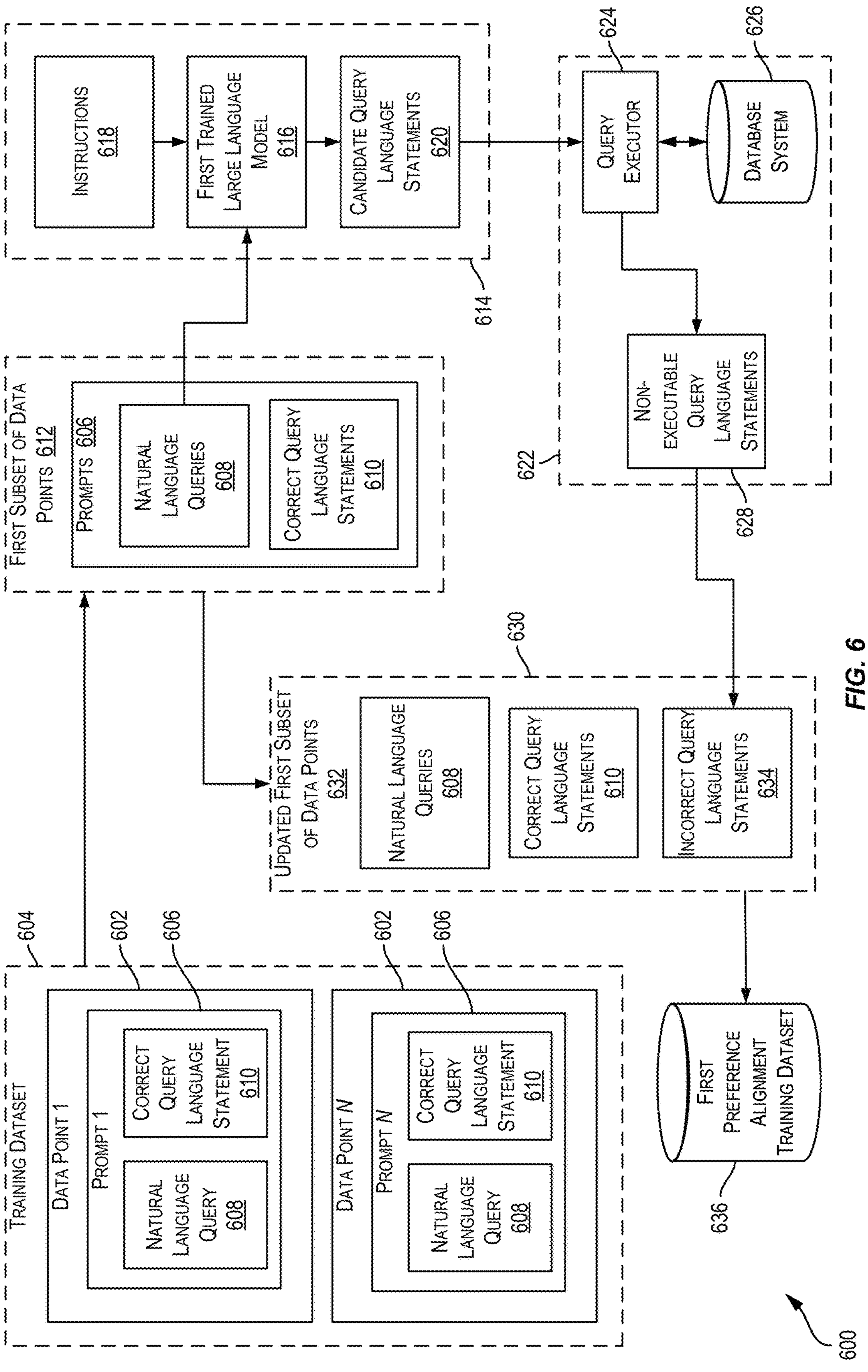
FIG. 6 is a simplified block diagram of certain aspects of a computing system that is configured to curate preference alignment training data for subsequent use in finetuning a language model used to perform natural language-to-query language tasks according to certain embodiments.

FIG. 6 is a block diagram illustrating certain aspects of a computing system 600 that is configured to curate preference alignment training (PAT) data for subsequent use in finetuning a LM used to perform NL-to-query language tasks such as query language statement generation. More specifically, the aspects of the computing system 600 depicted in FIG. 6 are utilized to curate execution-based PAT data. As illustrated in FIG. 6, the computing system 600 accesses a set of data points 602 (i.e., data point 1 through data point N) of a training dataset 604. The training dataset 604 may comprise, for example, Spider training data. Each data point of the set of data points 602 comprises a prompt 606 (i.e., prompt 1 through prompt point N). Each prompt 606 may include various items of data, including but not limited to, an instruction, a database schema, a natural language query (user question), and a correct (executable) query language statement (i.e., a query language statement that retrieves the correct data needed to answer the user question). In this example, only the natural language query 608 and the correct query language statement 610 of a given prompt 606 are used by the computing system 600 during an execution-based PAT data generation operation, thus the other possible items of data that may be associated with the prompts 606 are not shown.

The prompts 606 and the data items associated therewith may be stored in one or more storage devices or databases and accessed and/or retrieved by the computing system 600. In some implementations, the prompts 606 represents a request for information that is stored in a database, such as a database of the database system 626. For example, a prompt 606 may represent a request for information from a database of a concert ticket broker about upcoming concerts in a particular geographic area and may include a natural language statement such as "Show the stadium name and the number of concerts in each stadium."

In some implementations, the prompt 606 can include one or more conditions in which the information requested should be retrieved. Examples of conditions include, but are not limited to, date, time, geographic region, item categories, and so on. For example, for an input prompt that includes the question "Which professionals live in the state of Indiana or have performed more than 2 treatments?," the portion of the request "in the state of Indiana" represents a geographic restriction condition under which the information requested should be retrieved (e.g., only professionals located in Indiana) and the portion of the request "have performed more than 2 treatments" represents an experience level restriction condition under which the information requested should be retrieved (e.g., only professionals who have performed more than two treatments rather than all professionals). In some implementations, the prompt 606 can include one or more terms that identify one or more conditions in which the requested information should be retrieved. Examples of terms that can be included in the prompt 606 may include, but are not limited to, "where," "condition," "unless," and the like (e.g., "Show me all employees under the condition they live in Los Angeles"). In some implementations, the prompt 606 can include a labeled section that identifies one or more conditions in which the requested information should be retrieved. For example, the input prompt 606 can include a section labeled "Conditions:" followed by one or more conditions in which the requested information should be retrieved.

In some implementations, the prompt 606 can identify a task to be performed. Examples of tasks to be performed include, but are not limited to, requests to retrieve information, requests to generate information, translations, sentiment analysis, and others. For example, the prompt 606 can include the natural language statement, "Act as if you are a text-to-code converter that produces a code-like statement for a question based on the following information," which identifies the task as text-to-code translation task. In another example of a translation task, the prompt 606 can include the natural language statement, "Act as if you are a text-to-SQL converter that produces a SQL-like answer for a question based on a schema." In some implementations, for text-to-code translation tasks (e.g., text-to-SQL, text-to-Python, and the like), the prompt 606 can include one or more terms that identify the appropriate programming language for the output statement predicted by the language model 616. For example, the prompt 606 can include the term "SQL" or "Python" to indicate that the output statement should be a SQL statement (e.g., "Using SQL, show me all employees under age 25") or a Python statement (e.g., "Using Python, show me all employees under 25").

In some implementations, the prompt 606 can include information describing the architecture, organization, and/or structure of the database to be queried. In some implementations, the prompt 606 can include a portion or all of the database schema information for the database that is to be queried. The database schema information can define how data is organized within the database and can include logical constraints such as table names, attributes, column names, fields, data types, values, and the relationships between these entities. In some implementations, the database can be a relational database that includes one or more tables with each table including one or more columns with each column including one or more rows of values. Each table and column of the relational database can be named with unique identifiers, each of which can include one or more words. For example, the database of a retail store can include the column names "Customer_First_Name; Customer_Last_Name; Customer_Age; Customer_Zipcode; Purchase_Date; Item_Category" and the database schema information for the retail store's database can define how the columns are organized within the database (e.g., column order) and the column names.

The programming language information for the programming language to be used to query the database can include a set of keywords for the programming language. Examples of programming languages include, but are not limited to, SQL, Python, Java, and the like. As used herein, a keyword for a programming language refers to a word in the programming language that is used by the programming language to perform an operation. As such, the set of keywords for the programming language can represent operations that can be performed by the programming language. In some implementations, in the case of the SQL programming language, the set of keywords for SQL can include 44 keywords. For example, for the SQL programming language, the keyword SELECT which represents an operation to select data from a database and the keyword FROM which represents an operation that specifies which table to select the data from can be included in the set of keywords.

As described below, the computing system 600 of FIG. 6 generates a first preference alignment training dataset 636 using a first subset of data points 612 of the set of data points 602. The first subset of data points 612 thus includes some number of the prompts 606 of the set of data points 602, and each prompt 606 includes a natural language query 608 and the correct query language statement 610 for the natural language query 608, as previously described.

The computing system 600 includes a candidate query language statement generation stage 614 that is arranged to receive or access the natural language queries 608 in the first subset of data points 612. The candidate query language statement generation stage 614 can utilize a first trained large language model (LLM) 616 that receives the natural language queries 608 as input, and a set of instructions 618 that guide the output of the first trained LLM 616. The computing system 600 is configured to use the first trained LLM 616 to predict candidate query language statements 620 for the natural language queries 608 of the first subset of data points 612 of the set of data points 602.

The computing system 600 also includes a query stage 622. The query stage 622 can include a query executor 624. The query stage 622 can also include, or may be otherwise in communication with, a database system 626. The computing system 600 can use the query stage 622 to determine that a candidate query language statement 620 is not executable (i.e., is an non-executable candidate query language statement 628) by causing the query executor 624 to submit the candidate query language statements 620 to the database system 626. Because it is desired to include non-executable candidate query language statements 628 in the first preference alignment training dataset 636, the first trained LLM 616 can be caused to intentionally generate non-executable candidate query language statements 628 (or at least a greater number than usual of non-executable candidate query language statements 628). For example, the first trained LLM 616 can be encouraged to generate non-executable candidate query language statements 628 by increasing a value of a runtime temperature parameter of the first trained LLM 616.

After determining that at least some of the candidate query language statements 620 are non-executable candidate query language statements 628, the computing system 600 produces, at a first PAT dataset curation stage 630, an updated version of the first subset of data points 632 by including the non-executable candidate query language statements 628 in the first subset of data points 612 as incorrect query language statements 634 for the natural language queries 608 of the first subset of data points 612. The updated version of the first subset of data points 632 is then included in a first preference alignment training dataset 636. Thus, the first preference alignment training dataset 636 includes the natural language queries 608, the correct query language statements 610, and any other data items associated with the prompts 606 of the first subset of data points 612, as well as the incorrect query language statements 634 generated by the query stage 622 of the computing system 600. The use of the first preference alignment training dataset 636 is described in more detail below.

Figure 7:
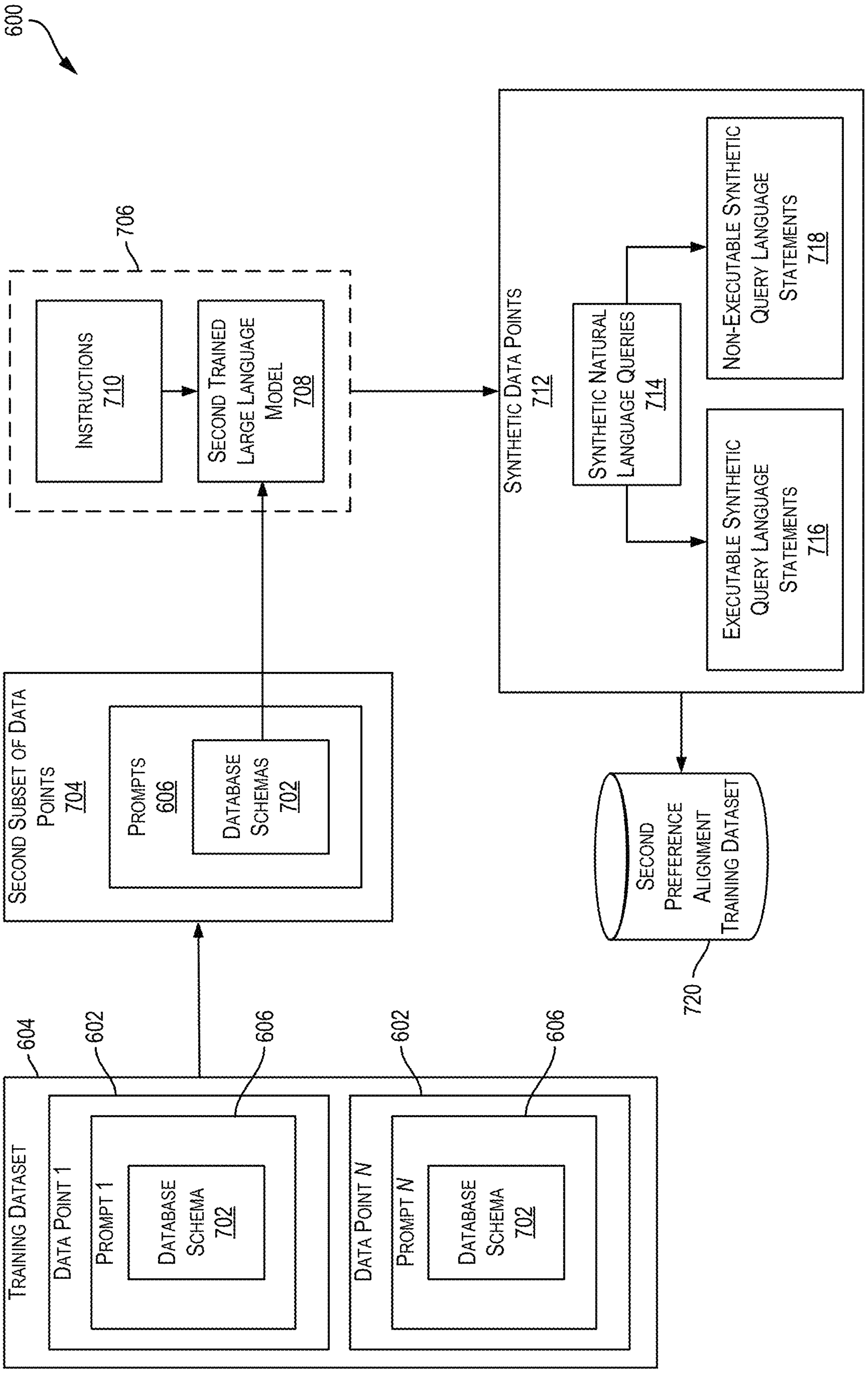
FIG. 7 is a simplified block diagram of other aspects of the computing system of FIG. 6.

FIG. 7 is a block diagram illustrating other aspects of the computing system 600. More specifically, the aspects of the computing system 600 depicted in FIG. 7 are utilized to curate LLM-based PAT data. As illustrated in FIG. 7, the computing system 600 again accesses the set of data points 602 (i.e., data point 1 through data point N) of the training dataset 604. In this example, only the database schema 702 of a given prompt 606 is used by the computing system 600 during a LLM-based PAT data generation operation, thus the other possible items of data that may be associated with the prompts 606 are not shown.

The computing system 600 generates a second preference alignment training dataset 720 using a second subset of data points 704 of the set of data points 602. The second subset of data points 704 thus includes some number of the prompts 606 of the set of data points 602, and each prompt 606 includes a database schema 702, as previously described.

The computing system 600 includes a synthetic data point generation stage 706 that is arranged to receive or access the database schemas 702 in the second subset of data points 704. The synthetic data point generation stage 706 can utilize a second trained large language model (LLM) 708 that receives the database schemas 702 as input, and a set of instructions 710 that guide the output of the trained second trained LLM 708. LLMs may have inherent synthetic data generation capabilities, and the process of LLM-based data generation described herein can leverage these generation capabilities of LLMs to generate synthetic data. In this regard, the computing system 600 can use the second trained LLM 708 to generate a plurality of synthetic data points 712 for the second preference alignment training dataset 720.

The computing system 600 may use the synthetic data point generation stage 706 to create the synthetic data points 712 in several ways. For example, the computing system 600 can execute the instructions 710 to cause the second trained LLM 708 to generate synthetic natural language queries 714 based on the database schemas 702 defined in the prompts 606 of the second subset of data points 704 of the set of data points 602. The computing system 600 can also execute the instructions 710 to cause the second trained LLM 708 to predict, based on the synthetic natural language queries 714, executable synthetic query language statements 716 for the synthetic natural language queries 714. The computing system 600 can further execute the instructions 710 to cause the second trained LLM 708 to predict, based on the synthetic natural language queries 714, non-executable synthetic query language statements 718 for the synthetic natural language queries 714. The plurality of synthetic data points 712 can then be generated from the synthetic natural language queries 714, the executable synthetic query language statements 716, and the non-executable synthetic query language statements 718. The plurality of synthetic data points 712 is then included in the second preference alignment training dataset 720, the use of which is described in more detail below. In some examples, the second trained LLM may also be instructed to predict a new user question that may correspond to a given executable synthetic query language statement 716. Likewise, the second trained LLM may be further instructed to predict a new prompt that may correspond to the new user question. In this manner, a plurality of synthetic data points 712 that are unrelated to the data points 602 in the training dataset can be generated by the second trained LLM 708 and used to populate the second preference alignment training dataset 720.

The first preference alignment training dataset 636 and the second preference alignment training dataset 720 may then be combined to generate a preference alignment training dataset for subsequent use in finetuning a LM to improve the LM's NL-to-query language performance and to address one or more weaknesses of the LM relative thereto. In at least some examples, combining the first preference alignment training dataset 636 and the second preference alignment training dataset 720 to generate the preference alignment training dataset includes performing at least one filtering operation of a plurality of filtering operations on the first preference alignment training dataset 636 and the second preference alignment training dataset 720.

Figure 8:
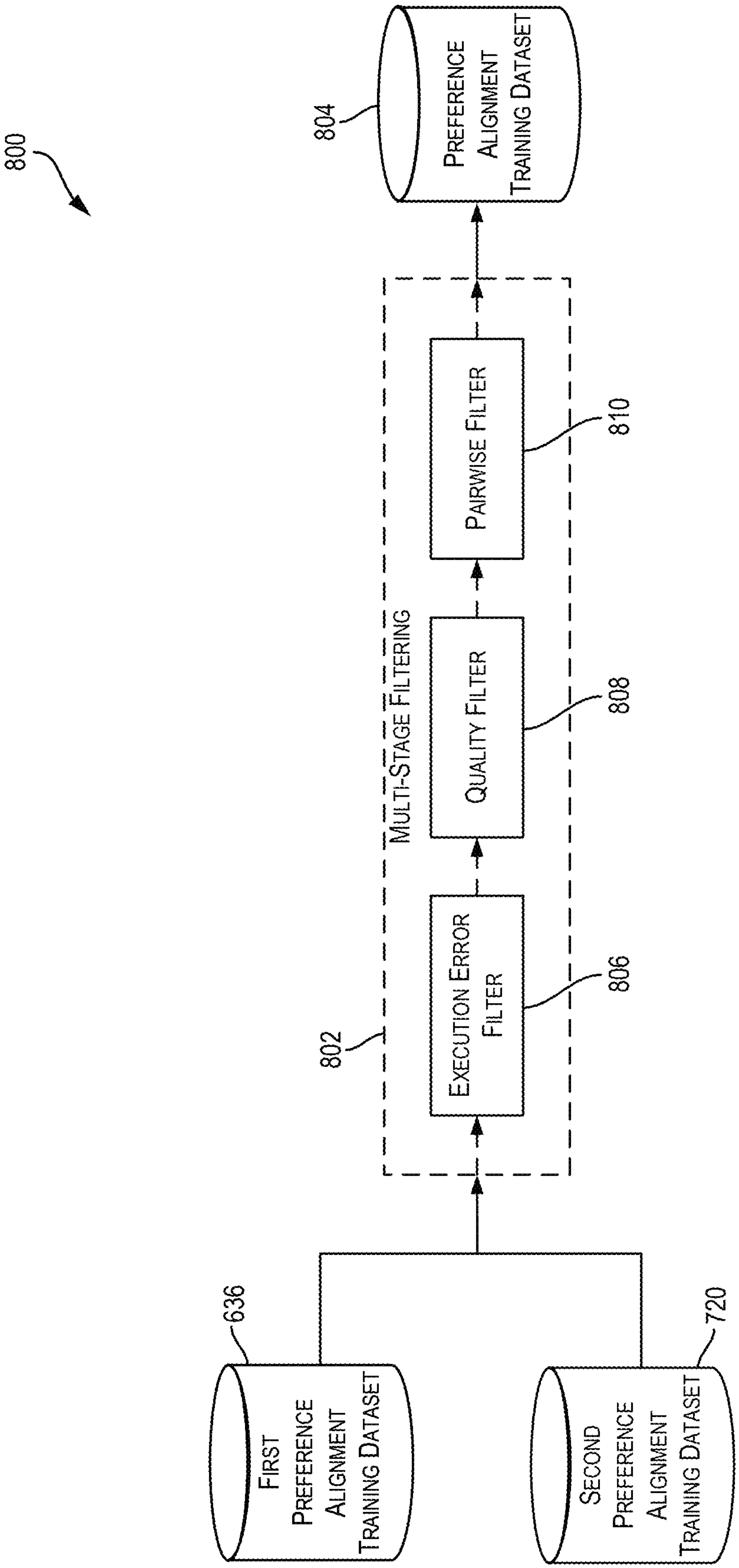
FIG. 8 is a flow diagram of a filtering stage of the computing system of FIG. 6 according to certain embodiments.

FIG. 8 is a flow diagram illustrating one example of a filtering stage 800 of the computing system 600. In this example, the filtering stage 800 executes a filtering operation on the first preference alignment training dataset 636 and the second preference alignment training dataset 720 relative to producing a preference alignment training dataset 804 from the data points in the first preference alignment training dataset 636 and the second preference alignment training dataset 720. As shown, the filtering operation can be a multi-stage filtering operation 802. In this example, the multi-stage filtering operation 802 includes three stages, but a lesser or greater number of filtering stages may be present in other examples.

Because the second preference alignment training dataset 720 shown in and described with respect to FIG. 7 is LLM-generated, the second preference alignment training dataset 720 may include unexpected non-executable synthetic query language statements in addition to the non-executable synthetic query language statements 718 that were intentionally generated. For example, some of the executable synthetic query language statements 716 generated by the second trained LLM 708 may actually turn out to be non-executable when submitted to a database system. Unexpected non-executable synthetic query language statements can cause execution errors and should be removed. Therefore, a first stage of the multi-stage filtering operation 802 may include an execution error filter 806. Use of the execution error filter 806 may involve attempting to execute the executable synthetic query language statements 716 and the non-executable synthetic query language statements 718 generated by the second trained LLM 708 by submitting the same to a database system. The database system may be the database system 626 of FIG. 6 or another database system. By submitting the executable synthetic query language statements 716 and the non-executable synthetic query language statements 718 to a database system for execution, it can be determined if any of the executable synthetic query language statements 716 are actually not executable and whether any of the non-executable synthetic query language statements 718 are actually executable. In some examples, the outputs of the executions and any errors associated with the executions of both the executable synthetic query language statements 716 and the non-executable synthetic query language statements 718 can be collected and used in the next stage of the multi-stage filtering operation 802. In some examples, a filtered second preference alignment training dataset may be produced by removing from the second preference alignment training dataset 720 any synthetic data points that are determined to erroneously include an executable synthetic query language statement that is not executable or a non-executable synthetic query language statement that is executable In the example of FIG. 8, a next stage of the multi-stage filtering operation 802 includes a quality filter 808. The quality filter 808 may be used to score the data in the first preference alignment training dataset 636 and the second preference alignment training dataset 720. The quality filter 808 may score the data at least one large language model-as-a-judge trained to grade query language statements. More specifically, use of the quality filter 808 may involve scoring, using the least one large language model-as-a-judge, a quality of the correct query language statement 610 and the incorrect query language statement 634 of each data point of the updated first subset of data points 632 in the first preference alignment training dataset 636 and a quality of the executable synthetic query language statement 716 and the non-executable synthetic query language statement 718 of each synthetic data point 712 in the second preference alignment training dataset 720 (or the filtered second preference alignment training dataset 720), given the prompts associated therewith.

Use of the quality filter 808 may more specifically involve, for each updated data point of the first preference alignment training dataset 636, assigning, by the at least one large language model-as-a-judge, a scaled quality score to the correct query language statement 610 without consideration of the quality of the incorrect query language statement 634 and a scaled quality score to the incorrect query language statement 634 without consideration of the quality of the correct query language statement 610. Similarly, for each synthetic data point of the second preference alignment training dataset 720, assigning, by the at least one large language model-as-a-judge, a scaled quality score to the executable synthetic query language statement 716 without consideration of the quality of the non-executable synthetic query language statement 718 and a scaled quality score to the non-executable synthetic query language statement 718 without consideration for the quality of the executable synthetic query language statement 716.

In some examples, the scaled quality scores can be based on a threshold range. In such a case, a lowest threshold value of the threshold range can indicate an incorrect query language statement 634 or a non-executable synthetic query language statement 718 with no correction possible, and a highest threshold value of the threshold range can indicate a correct query language statement 610 or an executable synthetic query language statement 716 with no correction needed.

As illustrated, a next stage of the multi-stage filtering operation 802 example of FIG. 8 includes a pairwise filter 810. The pairwise filter 810 may be used to further score the correct and incorrect query language statements 610, 634 in the first preference alignment training dataset 636 and the executable and non-executable synthetic query language statements 718 in the second preference alignment training dataset 720. More specifically, for each updated data point 632 of the first preference alignment training dataset 636 where the correct query language statement 610 and the incorrect query language statement 634 both receive a scaled quality score that meets the predetermined threshold, the at least one large language model-as-a-judge compares the correct query language statement 610 to the incorrect query language statement 634 and, based on the comparing, assigns a Likert scaled score to the correct query language statement and incorrect query language statement pair. Likewise, for each synthetic data point 712 of the second preference alignment training dataset 720 where the executable synthetic query language statement 716 and the non-executable synthetic query language statement 718 both receive a scaled quality score that meets the associated predetermined threshold, the at least one large language model-as-a-judge compares the executable synthetic query language statement 716 to the non-executable synthetic query language statement 718 and, based on the comparing, assigns a Likert scaled score to the executable synthetic query language statement and non-executable synthetic query language statement pair.

Subsequent to the multi-stage filtering operation 802, the preference alignment training dataset 804 can be generated to include only a plurality of the data points in the first preference alignment training dataset 636 having correct query language statements 610 and incorrect query language statements 634 receiving quality scores that meet predetermined threshold values, and a plurality of the synthetic data points 712 of the second preference alignment training dataset 720 having executable synthetic query language statements 716 and non-executable synthetic query language statements 718 receiving quality scores that meet predetermined threshold values. As a result of the filtering operation, only high-quality data points are retained. In one example, approximately 16,000 pairs of correct and incorrect query language statements from the execution-based PAT generation process and approximately 38,000 pairs of executable and non-executable query language statements from the LLM-based PAT generation process are present in the preference alignment training dataset 804. Thus, the preference alignment training dataset 804 is optimized for finetuning a LM to perform NL-to-query language tasks without the weaknesses and other problems described above relative to the use of LMs in such a manner.

In some examples, the at least one large language model-as-a-judge used in the multi-stage filtering operation 802 is a plurality of large language model judges. The plurality of large language model judges can be used in different configurations to filter the curated preference alignment training data. For example, the plurality of large language model judges can be used in a panel configuration, where each large language model judge is assigned a different weight based on a strength of the large language model used as the judge. In another example, the plurality of large language model judges can be used in a serial configuration, where the plurality of large language model judges are arranged from weakest to strongest, and filtering occurs at each large language model judge in a serial manner. In some examples, the plurality of large language model judges can be three large language model judges. In some examples, the three large language model judges may comprise the models Mixtral 22x8b, LLama 3 70b, and commandR+. Other large language model-as-a-judge configurations, quantities, and models are also possible.

Figure 9:
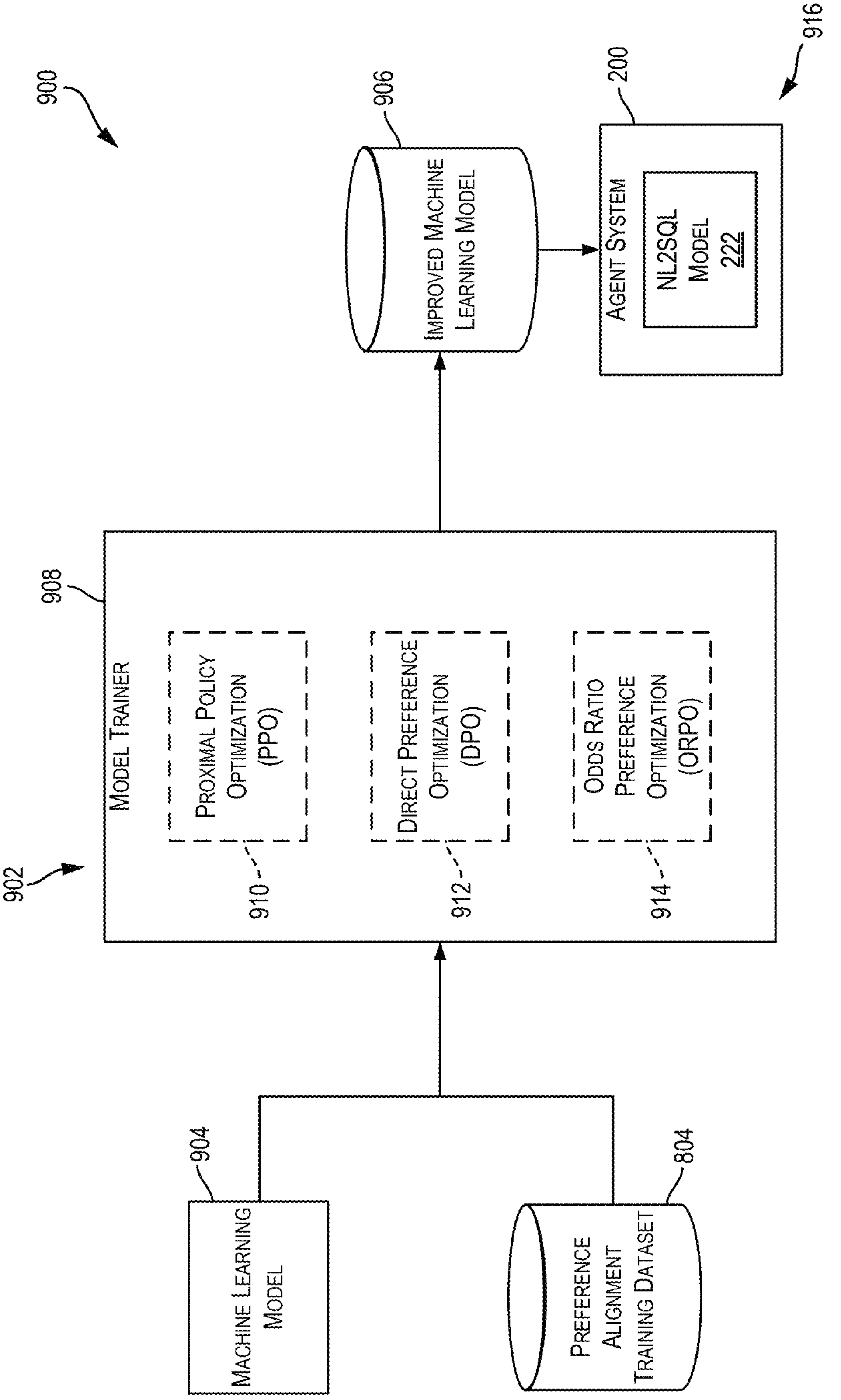
FIG. 9 is a flow diagram of a training stage of the computing system of FIG. 6 according to certain embodiments.

FIG. 9 is a flow diagram illustrating one example of a training and deployment stage 900 of the computing system 600. In this example, the training stage 900 executes a training (e.g., finetuning) operation 902 on a machine-learning model 904 using the preference alignment training dataset 804 to generate an improved machine-learning model 906 whose performance is optimized with respect to NL-to-query language conversion tasks. In some examples, the machine-learning model 904 may be a pre-trained language model that has already been subjected to supervised finetuning (SFT) but still includes weaknesses such as those described herein when performing NL-to-query language tasks such as generating query language statements. For example, the machine-learning model 904 may be the Beta RCI model, which has already been finetuned on top of the Phind-code-llama-V2 model using a NL-to-query language dataset. In the improved machine-learning model 906, the weaknesses associated with the machine-learning model 904 when used to generate query language statements are reduced or eliminated and the quality of query language statements generated by the improved machine-learning model 906 in response to natural language questions is optimized in comparison to those generated by the machine-learning model 904. More particularly, training (e.g., finetuning) the machine-learning model 904 at the training stage involves accessing the machine-learning model 904 by the computing system 600 (or by another computing system at the instruction of the computing system 600), and using the preference alignment training dataset 804 to generate the improved machine-learning model 906. The deployment stage 916 includes deploying the improved machine-learning model 906 to a system. In some examples, and as depicted in FIG. 9, the system may be an agent-based system such as the agent system 200 shown in and described with respect to FIG. 2. In such an example, the improved machine-learning model 906 may serve as the NL2SQL model 222 of the agent system 200. In other examples, the system may be a different type of a digital assistant system, such as a chatbot or the like.

The training stage 900 may include a model trainer 908 to generate the improved machine-learning model 906 by training the machine-learning model 904 using the preference alignment training dataset 804. As part of the training process, the model trainer 908 can perform a hyperparameter tuning process. The hyperparameter tuning process selects hyperparameters for configuring the machine-learning model 904. Hyperparameters are settings that can be tuned or optimized to control the behavior of the machine-learning model 904. Most models explicitly define hyperparameters that control different aspects of the models such as memory or cost of execution. However, additional hyperparameters may be defined to adapt a model to a specific scenario (e.g., a NL-to-query language scenario). For example, additional hyperparameters may be defined to determine the number of hidden units or layers of a model, the learning rate of a model, the convolution kernel width, and/or the number of parameters for a model. The training process can select model parameters (e.g., weights and/or biases) for further configuring the machine-learning model 904 by iteratively performing operations of inputting batches or portions of the preference alignment training dataset 804 into a transformer and finding a set of model parameters (e.g., weights and/or biases) that maximizes or minimizes an objective function. The objective function can be constructed to measure the difference between outputs inferred using the transformer with different sets of model parameters and reconstructions of the batches of the preference alignment training dataset 804 input training data.

As represented, the model trainer 908 may implement one or more finetuning techniques on the machine-learning model 904 to generate the improved machine-learning model 906. In this example, the training techniques are shown to include one or more of proximal policy optimization (PPO) 910, direct preference optimization (DPO) 912, and odds ratio preference optimization (ORPO) 914. As these are known model training techniques, a further explanation thereof is not provided herein. Additionally, the PPO, DPO, and ORPO training techniques shown in FIG. 9 are presented only for purposes of illustration, and it should be understood that other model training (e.g., finetuning) techniques or combinations of model training techniques may be employed by the model trainer 908 in other examples.

Illustrative Methods

FIG. 10 illustrates an example process 1000 for automatically curating preference alignment training data for subsequent use in training a machine-learning model used to perform natural language-to-query language tasks. The processing depicted in FIG. 10 may be implemented in software (e.g., code, instructions, a program) executed by one or more processing units (e.g., one or more processors, cores) of the respective systems, hardware, or combinations thereof described throughout. The software may be stored on a non-transitory storage medium (e.g., on a memory device). Although the methods presented in FIG. 10 depict the various processing steps occurring in a particular sequence or order, this is not intended to be limiting. In certain alternative embodiments, the steps may be performed in parallel and/or in a different order. In certain embodiments, the processing depicted in FIG. 10 may be performed by the master agent system 200 and/or the computing system 600. In other embodiments, such as in the embodiments depicted in FIGS. 11-15, the processing depicted in FIG. 10 may be offered as a cloud service and performed by the infrastructure as a service (IaaS) architecture 1100.

At block 1002 of the process 1000, a set of data points of a training dataset is accessed. Each data point of the set of data points comprises a prompt including a natural language query and a correct query language statement for the natural language query. The training dataset may be a preexisting training dataset including training data that has been developed for training machine-learning models to perform NL-to-query language tasks such as generating query language statements.

At block 1004, a first preference alignment training dataset is generated. The first preference alignment training dataset may be generated using an execution-based preference alignment training data generation technique. For example, generating the first preference alignment training dataset can comprise predicting, using a first trained large language model (LLM), candidate query language statements for the natural language queries of a first subset of data points of the set of data points. Generating the first preference alignment training dataset can also comprise determining that the candidate query language statements are not executable by submitting the candidate query language statements to a database system. Generating the first preference alignment training dataset can additionally comprise, after determining that the candidate query language statements are not executable, producing an updated version of the first subset of data points by including the candidate query language statements in the first subset of data points as incorrect query language statements for the natural language queries of the first subset of data points. Generating the first preference alignment training dataset can further comprise, including the updated version of the first subset of data points in the first preference alignment training dataset.

As previously explained, it is desirable to include incorrect/non-executable candidate query language statements in the first preference alignment training dataset. Thus, in some examples, the first trained LLM can be instructed to intentionally generate non-executable candidate query language statements or may at least be encouraged to generate a greater number of non-executable candidate query language statements than would typically be generated. For example, the first trained LLM can be encouraged to generate incorrect query language statements by increasing a value of a runtime temperature parameter of the first trained LLM.

At block 1006, a second preference alignment training dataset is generated. The second preference alignment training dataset may be generated using LLM-based preference alignment training data generation technique. That is, a second trained LLM is used to generate synthetic natural language queries and corresponding synthetic query language statements for the synthetic natural language queries.

Generating the second preference alignment training dataset can more specifically comprise causing the second trained LLM to generate synthetic natural language queries based on database schemas defined in the prompts of a second subset of data points of the set of data points. Generating the second preference alignment training dataset can also comprise causing the second trained LLM to predict, based on the synthetic natural language queries, executable synthetic query language statements for the synthetic natural language queries and non-executable synthetic query language statements for the synthetic natural language queries. Generating the second preference alignment training dataset can additionally comprise generating a plurality of synthetic data points comprising the synthetic natural language queries, the executable synthetic query language statements, and the non-executable synthetic query language statements. The plurality of synthetic data points can then be included in the second preference alignment training dataset.

At block 1008, a preference alignment training dataset can be generated by combining the first preference alignment training dataset and the second preference training dataset. Combining the first preference alignment training dataset and the second preference training dataset may comprise performing at least one filtering operation of a plurality of filtering operations on the first preference alignment training dataset and the second preference training dataset. The plurality of filtering operations may be stages of a multi-stage filtering process.

In some examples, the multistage filtering process may include, for each synthetic data point in the second preference alignment training dataset, determining whether the executable synthetic query language statement is executable and whether the non-executable synthetic query language statement is not executable by submitting the executable synthetic query language statement and the non-executable synthetic query language statement to the database system.

In some examples, the multistage filtering process may include scoring, using at least one large language model-as-a-judge trained to grade query language statements, a quality of the executable query language statement and the non-executable query language statement of each data point of the updated version of the first subset of data points in the first preference alignment training dataset, and a quality of the executable synthetic query language statement and the non-executable synthetic query language statement of each synthetic data point in the filtered second preference alignment training dataset, given the prompts associated therewith. In some examples, the at least one large language model-as-a-judge is a plurality of large language model judges and the plurality of large language model judges are used in one or both of two different configurations In some examples, only data points in the first preference alignment training dataset having executable query language statements and non-executable query language statements receiving quality scores that meet predetermined threshold values are included in the first preference alignment training dataset. Likewise, only synthetic data points of the second preference alignment training dataset having executable synthetic query language statements and non-executable synthetic query language statements receiving quality scores that meet predetermined threshold values may be included in the preference alignment training dataset.

Illustrative Systems

The term cloud service is generally used to refer to a service that is made available by a cloud service provider (CSP) to users (e.g., cloud service customers) on demand (e.g., via a subscription model) using systems and infrastructure (cloud infrastructure) provided by the CSP. Typically, the servers and systems that make up the CSP's infrastructure are separate from the user's own on-premise servers and systems. Users can thus avail themselves of cloud services provided by the CSP without having to purchase separate hardware and software resources for the services. Cloud services are designed to provide a subscribing user easy, scalable access to applications and computing resources without the user having to invest in procuring the infrastructure that is used for providing the services.

There are several cloud service providers that offer various types of cloud services. As discussed herein, there are various types or models of cloud services including IaaS, software as a service (SaaS), platform as a service (PaaS), and others. A user can subscribe to one or more cloud services provided by a CSP. The user can be any entity such as an individual, an organization, an enterprise, and the like. When a user subscribes to or registers for a service provided by a CSP, a tenancy or an account is created for that user. The user can then, via this account, access the subscribed-to one or more cloud resources associated with the account.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 11:
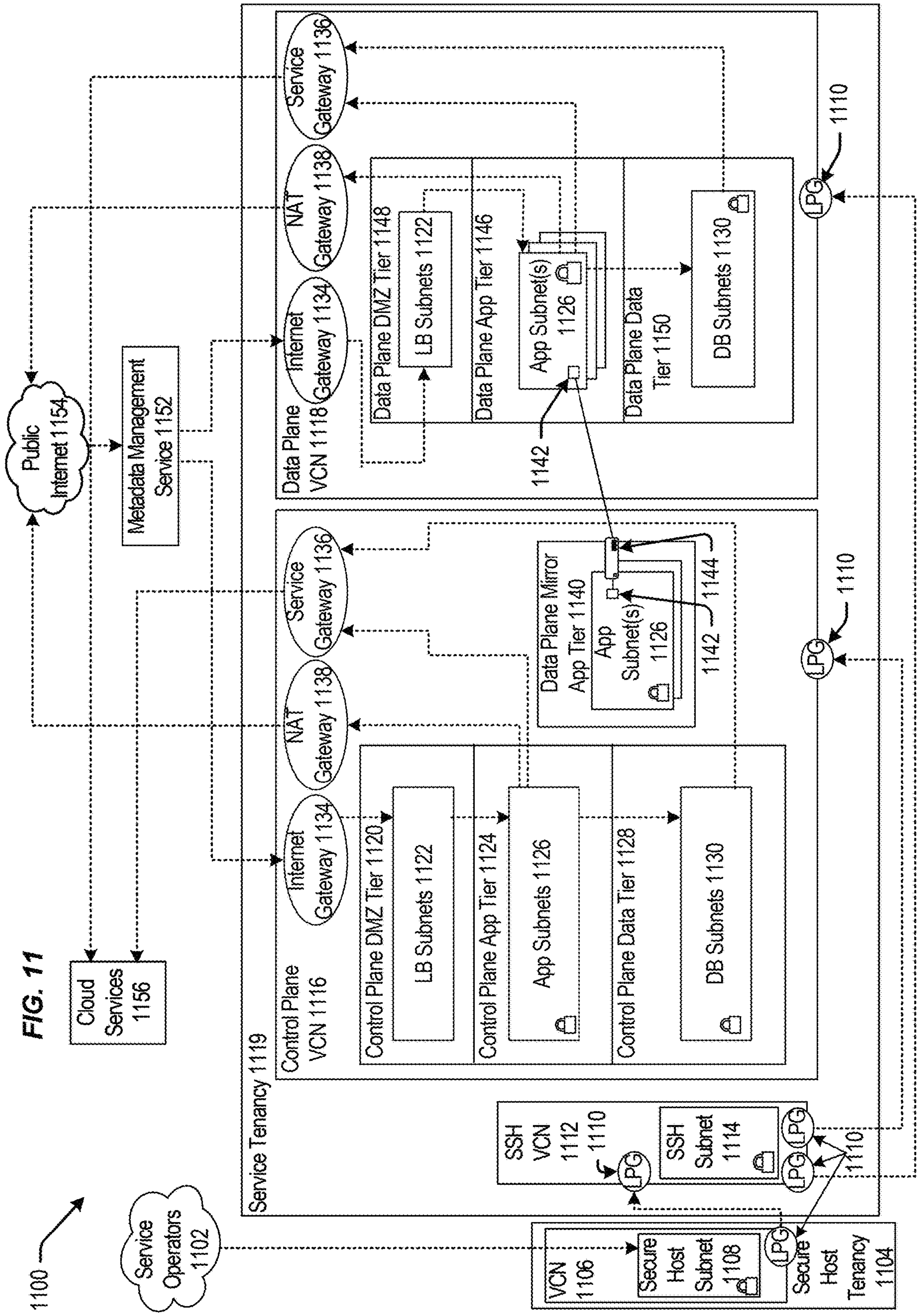
FIG. 11 is a block diagram illustrating one pattern for implementing a cloud infrastructure as a service system according to certain embodiments.

FIG. 11 is a block diagram 1100 illustrating an example pattern of an IaaS architecture, according to at least one embodiment. Service operators 1102 can be communicatively coupled to a secure host tenancy 1104 that can include a virtual cloud network (VCN) 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway (LPG) 1110 that can be communicatively coupled to a secure shell (SSH) VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone (DMZ) tier 1120 that acts as a perimeter network (e.g., portions of a corporate network between the corporate intranet and external networks). The DMZ-based servers may have restricted responsibilities and help keep breaches contained. Additionally, the DMZ tier 1120 can include one or more load balancer (LB) subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface (API) calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete (CRUD) operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Metadata that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of threat prevention, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 12:
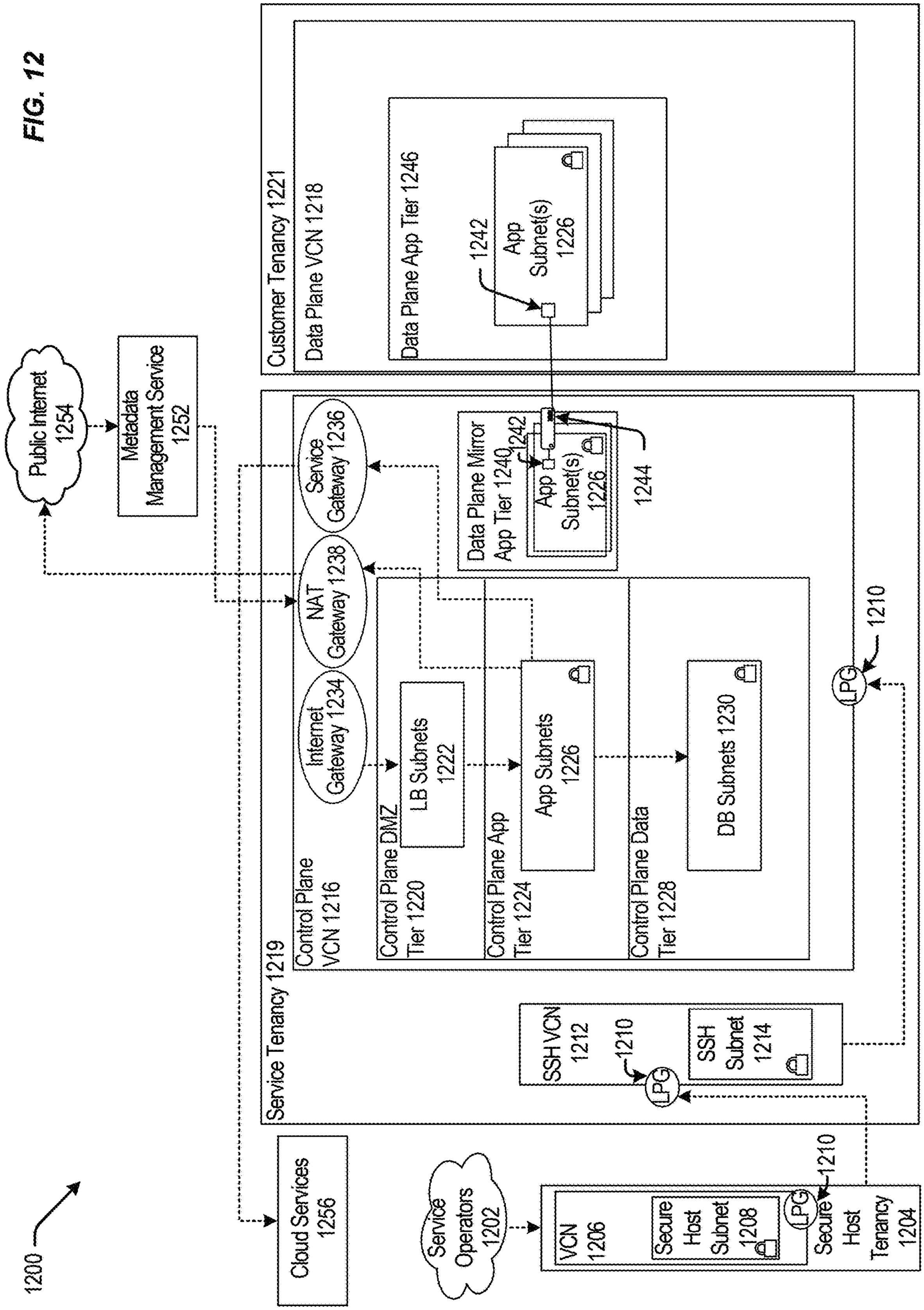
FIG. 12 is a block diagram illustrating another pattern for implementing a cloud infrastructure as a service system according to certain embodiments.

FIG. 12 is a block diagram 1200 illustrating another example pattern of an IaaS architecture, according to at least one embodiment. Service operators 1202 (e.g., service operators 1102 of FIG. 11) can be communicatively coupled to a secure host tenancy 1204 (e.g., the secure host tenancy 1104 of FIG. 11) that can include a virtual cloud network (VCN) 1206 (e.g., the VCN 1106 of FIG. 11) and a secure host subnet 1208 (e.g., the secure host subnet 1108 of FIG. 11). The VCN 1206 can include a local peering gateway (LPG) 1210 (e.g., the LPG 1110 of FIG. 11) that can be communicatively coupled to a secure shell (SSH) VCN 1212 (e.g., the SSH VCN 1112 of FIG. 11) via an LPG 1110 contained in the SSH VCN 1212. The SSH VCN 1212 can include an SSH subnet 1214 (e.g., the SSH subnet 1114 of FIG. 11), and the SSH VCN 1212 can be communicatively coupled to a control plane VCN 1216 (e.g., the control plane VCN 1116 of FIG. 11) via an LPG 1210 contained in the control plane VCN 1216. The control plane VCN 1216 can be contained in a service tenancy 1219 (e.g., the service tenancy 1119 of FIG. 11), and the data plane VCN 1218 (e.g., the data plane VCN 1118 of FIG. 11) can be contained in a customer tenancy 1221 that may be owned or operated by users, or customers, of the system.

The control plane VCN 1216 can include a control plane DMZ tier 1220 (e.g., the control plane DMZ tier 1120 of FIG. 11) that can include LB subnet(s) 1222 (e.g., LB subnet(s) 1122 of FIG. 11), a control plane app tier 1224 (e.g., the control plane app tier 1124 of FIG. 11) that can include app subnet(s) 1226 (e.g., app subnet(s) 1126 of FIG. 11), a control plane data tier 1228 (e.g., the control plane data tier 1128 of FIG. 11) that can include database (DB) subnet(s) 1230 (e.g., similar to DB subnet(s) 1130 of FIG. 11). The LB subnet(s) 1222 contained in the control plane DMZ tier 1220 can be communicatively coupled to the app subnet(s) 1226 contained in the control plane app tier 1224 and an Internet gateway 1234 (e.g., the Internet gateway 1134 of FIG. 11) that can be contained in the control plane VCN 1216, and the app subnet(s) 1226 can be communicatively coupled to the DB subnet(s) 1230 contained in the control plane data tier 1228 and a service gateway 1236 (e.g., the service gateway 1136 of FIG. 11) and a network address translation (NAT) gateway 1238 (e.g., the NAT gateway 1138 of FIG. 11). The control plane VCN 1216 can include the service gateway 1236 and the NAT gateway 1238.

The control plane VCN 1216 can include a data plane mirror app tier 1240 (e.g., the data plane mirror app tier 1140 of FIG. 11) that can include app subnet(s) 1226. The app subnet(s) 1226 contained in the data plane mirror app tier 1240 can include a virtual network interface controller (VNIC) 1242 (e.g., the VNIC of 1142) that can execute a compute instance 1244 (e.g., similar to the compute instance 1144 of FIG. 11). The compute instance 1244 can facilitate communication between the app subnet(s) 1226 of the data plane mirror app tier 1240 and the app subnet(s) 1226 that can be contained in a data plane app tier 1246 (e.g., the data plane app tier 1146 of FIG. 11) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g., the metadata management service 1152 of FIG. 11) that can be communicatively coupled to public Internet 1254 (e.g., public Internet 1154 of FIG. 11). Public Internet 1254 can be communicatively coupled to the NAT gateway 1238 contained in the control plane VCN 1216. The service gateway 1236 contained in the control plane VCN 1216 can be communicatively coupled to cloud services 1256 (e.g., cloud services 1156 of FIG. 11).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources, that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218 but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 11," may be located in Region 1 and in "Region 2." If a call to Deployment 11 is made by the service gateway 1236 contained in the control plane VCN 1216 located in Region 1, the call may be transmitted to Deployment 11 in Region 1. In this example, the control plane VCN 1216, or Deployment 11 in Region 1, may not be communicatively coupled to, or otherwise in communication with, Deployment 11 in Region 2.

Figure 13:
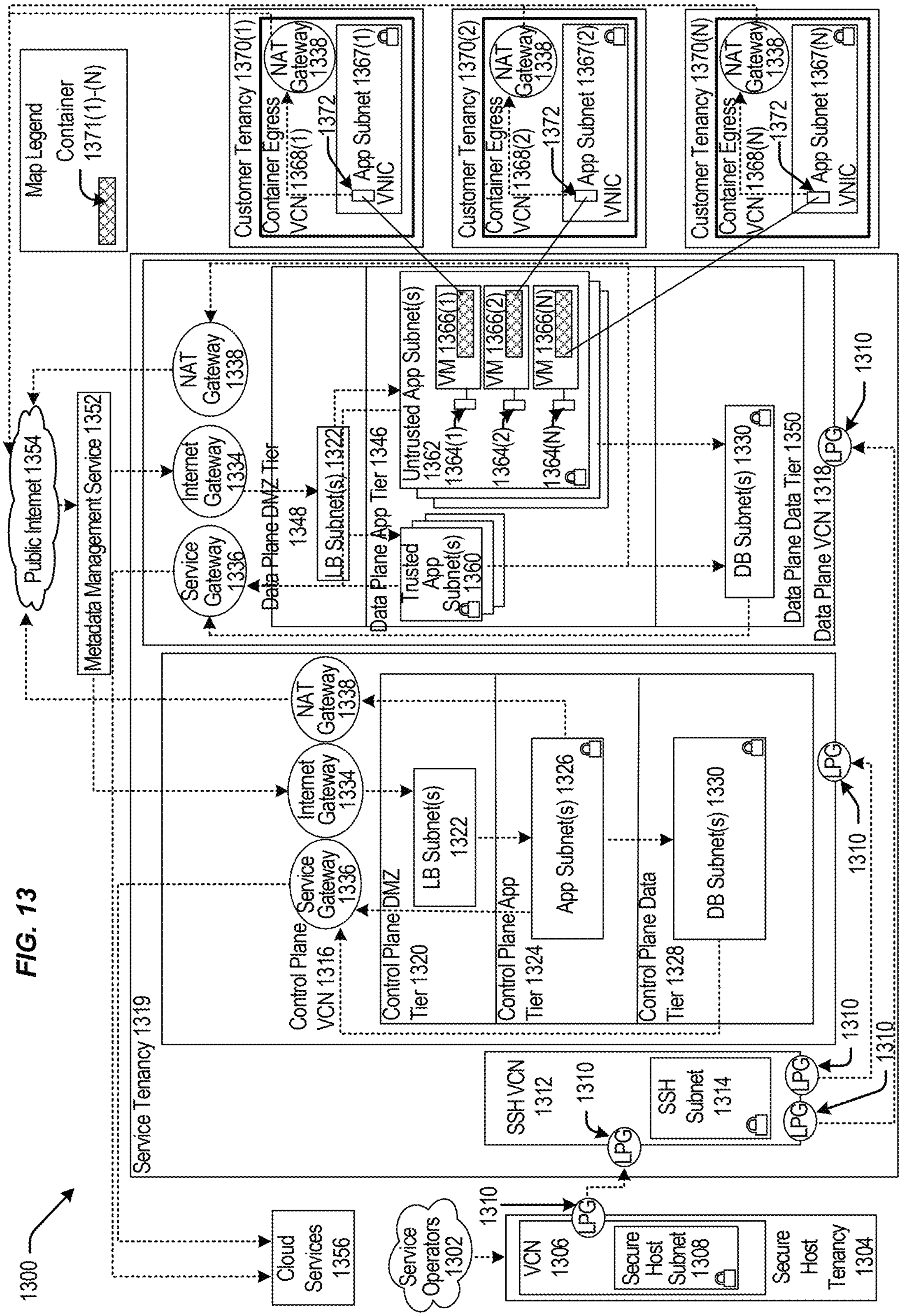
FIG. 13 is a block diagram illustrating another pattern for implementing a cloud infrastructure as a service system according to certain embodiments.

FIG. 13 is a block diagram 1300 illustrating another example pattern of an IaaS architecture, according to at least one embodiment. Service operators 1302 (e.g., service operators 1102 of FIG. 11) can be communicatively coupled to a secure host tenancy 1304 (e.g., the secure host tenancy 1104 of FIG. 11) that can include a virtual cloud network (VCN) 1306 (e.g., the VCN 1106 of FIG. 11) and a secure host subnet 1308 (e.g., the secure host subnet 1108 of FIG. 11). The VCN 1306 can include an LPG 1310 (e.g., the LPG 1110 of FIG. 11) that can be communicatively coupled to an SSH VCN 1312 (e.g., the SSH VCN 1112 of FIG. 11) via an LPG 1310 contained in the SSH VCN 1312. The SSH VCN 1312 can include an SSH subnet 1314 (e.g., the SSH subnet 1114 of FIG. 11), and the SSH VCN 1312 can be communicatively coupled to a control plane VCN 1316 (e.g., the control plane VCN 1116 of FIG. 11) via an LPG 1310 contained in the control plane VCN 1316 and to a data plane VCN 1318 (e.g., the data plane 1118 of FIG. 11) via an LPG 1310 contained in the data plane VCN 1318. The control plane VCN 1316 and the data plane VCN 1318 can be contained in a service tenancy 1319 (e.g., the service tenancy 1119 of FIG. 11).

The control plane VCN 1316 can include a control plane DMZ tier 1320 (e.g., the control plane DMZ tier 1120 of FIG. 11) that can include load balancer (LB) subnet(s) 1322 (e.g., LB subnet(s) 1122 of FIG. 11), a control plane app tier 1324 (e.g., the control plane app tier 1124 of FIG. 11) that can include app subnet(s) 1326 (e.g., similar to app subnet(s) 1126 of FIG. 11), a control plane data tier 1328 (e.g., the control plane data tier 1128 of FIG. 11) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1134 of FIG. 11) that can be contained in the control plane VCN 1316, and the app subnet(s) 1326 can be communicatively coupled to the DB subnet(s) 1330 contained in the control plane data tier 1328 and to a service gateway 1336 (e.g., the service gateway of FIG. 11) and a network address translation (NAT) gateway 1338 (e.g., the NAT gateway 1138 of FIG. 11). The control plane VCN 1316 can include the service gateway 1336 and the NAT gateway 1338.

The data plane VCN 1318 can include a data plane app tier 1346 (e.g., the data plane app tier 1146 of FIG. 11), a data plane DMZ tier 1348 (e.g., the data plane DMZ tier 1148 of FIG. 11), and a data plane data tier 1350 (e.g., the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g., public Internet 1154 of FIG. 11).

The Internet gateway 1334 contained in the control plane VCN 1316 and contained in the data plane VCN 1318 can be communicatively coupled to a metadata management service 1352 (e.g., the metadata management system 1152 of FIG. 11) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively coupled to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM

1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 14:
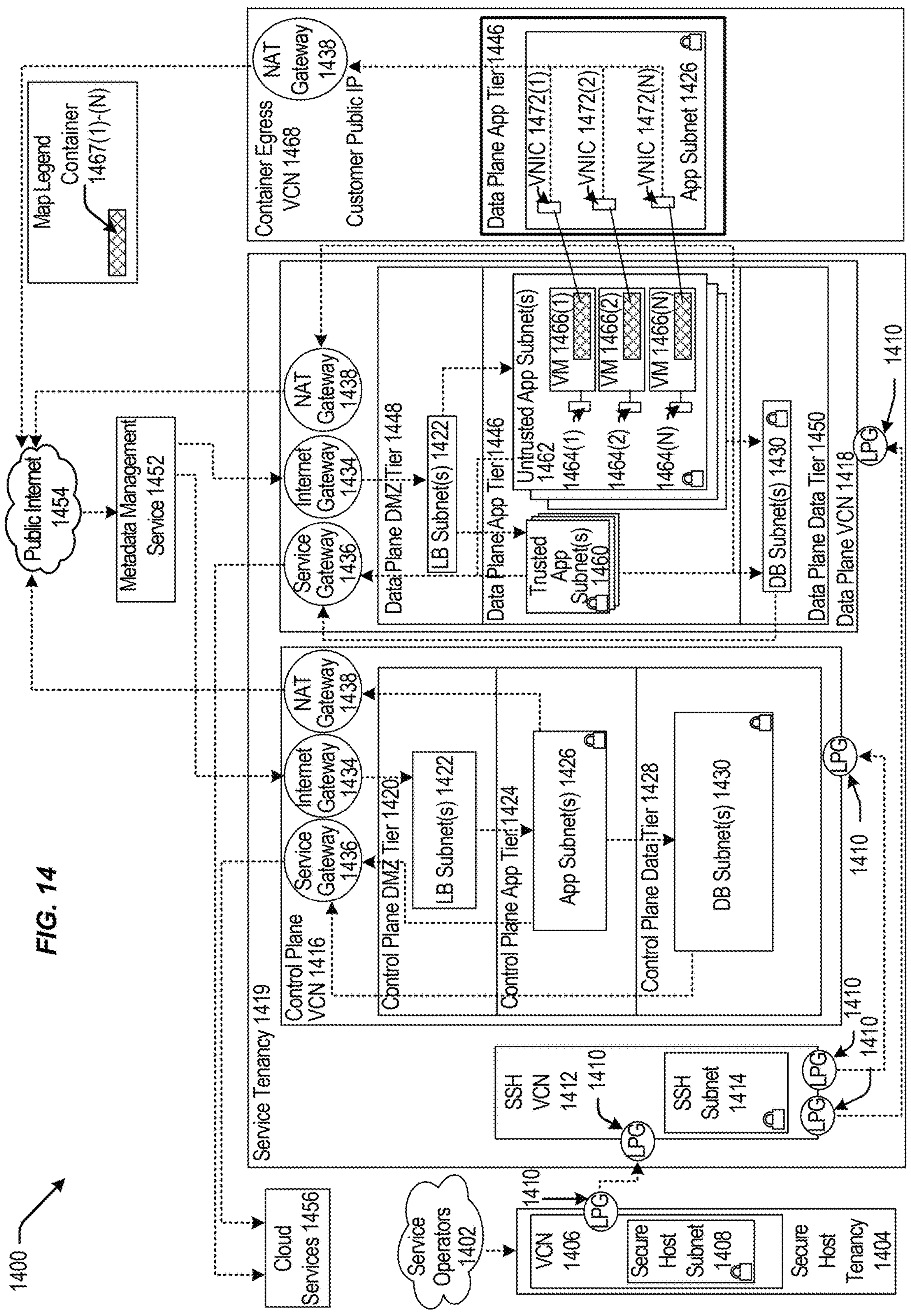
FIG. 14 is a block diagram illustrating another pattern for implementing a cloud infrastructure as a service system according to certain embodiments.

FIG. 14 is a block diagram 1400 illustrating another example pattern of an IaaS architecture, according to at least one embodiment. Service operators 1402 (e.g., service operators 1102 of FIG. 11) can be communicatively coupled to a secure host tenancy 1404 (e.g., the secure host tenancy 1104 of FIG. 11) that can include a virtual cloud network (VCN) 1406 (e.g., the VCN 1106 of FIG. 11) and a secure host subnet 1408 (e.g., the secure host subnet 1108 of FIG. 11). The VCN 1406 can include an LPG 1410 (e.g., the LPG 1110 of FIG. 11) that can be communicatively coupled to an SSH VCN 1412 (e.g., the SSH VCN 1112 of FIG. 11) via an LPG 1410 contained in the SSH VCN 1412. The SSH VCN 1412 can include an SSH subnet 1414 (e.g., the SSH subnet 1114 of FIG. 11), and the SSH VCN 1412 can be communicatively coupled to a control plane VCN 1416 (e.g., the control plane VCN 1116 of FIG. 11) via an LPG 1410 contained in the control plane VCN 1416 and to a data plane VCN 1418 (e.g., the data plane 1118 of FIG. 11) via an LPG 1410 contained in the data plane VCN 1418. The control plane VCN 1416 and the data plane VCN 1418 can be contained in a service tenancy 1419 (e.g., the service tenancy 1119 of FIG. 11).

The control plane VCN 1416 can include a control plane DMZ tier 1420 (e.g., the control plane DMZ tier 1120 of FIG. 11) that can include LB subnet(s) 1422 (e.g., LB subnet(s) 1122 of FIG. 11), a control plane app tier 1424 (e.g., the control plane app tier 1124 of FIG. 11) that can include app subnet(s) 1426 (e.g., app subnet(s) 1126 of FIG. 11), a control plane data tier 1428 (e.g., the control plane data tier 1128 of FIG. 11) that can include DB subnet(s) 1430 (e.g., DB subnet(s) 1330 of FIG. 13). The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1134 of FIG. 11) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 11) and a network address translation (NAT) gateway 1438 (e.g., the NAT gateway 1138 of FIG. 11). The control plane VCN 1416 can include the service gateway 1436 and the NAT gateway 1438.

The data plane VCN 1418 can include a data plane app tier 1446 (e.g., the data plane app tier 1146 of FIG. 11), a data plane DMZ tier 1448 (e.g., the data plane DMZ tier 1148 of FIG. 11), and a data plane data tier 1450 (e.g., the data plane data tier 1150 of FIG. 11). The data plane DMZ tier 1448 can include LB subnet(s) 1422 that can be communicatively coupled to trusted app subnet(s) 1460 (e.g., trusted app subnet(s) 1360 of FIG. 13) and untrusted app subnet(s) 1462 (e.g., untrusted app subnet(s) 1362 of FIG. 13) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g., public Internet 1154 of FIG. 11).

The Internet gateway 1434 contained in the control plane VCN 1416 and contained in the data plane VCN 1418 can be communicatively coupled to a metadata management service 1452 (e.g., the metadata management system 1152 of FIG. 11) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively coupled to cloud services 1456.

In some examples, the pattern illustrated by the architecture of block diagram 1400 of FIG. 14 may be considered an exception to the pattern illustrated by the architecture of block diagram 1300 of FIG. 13 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 15:
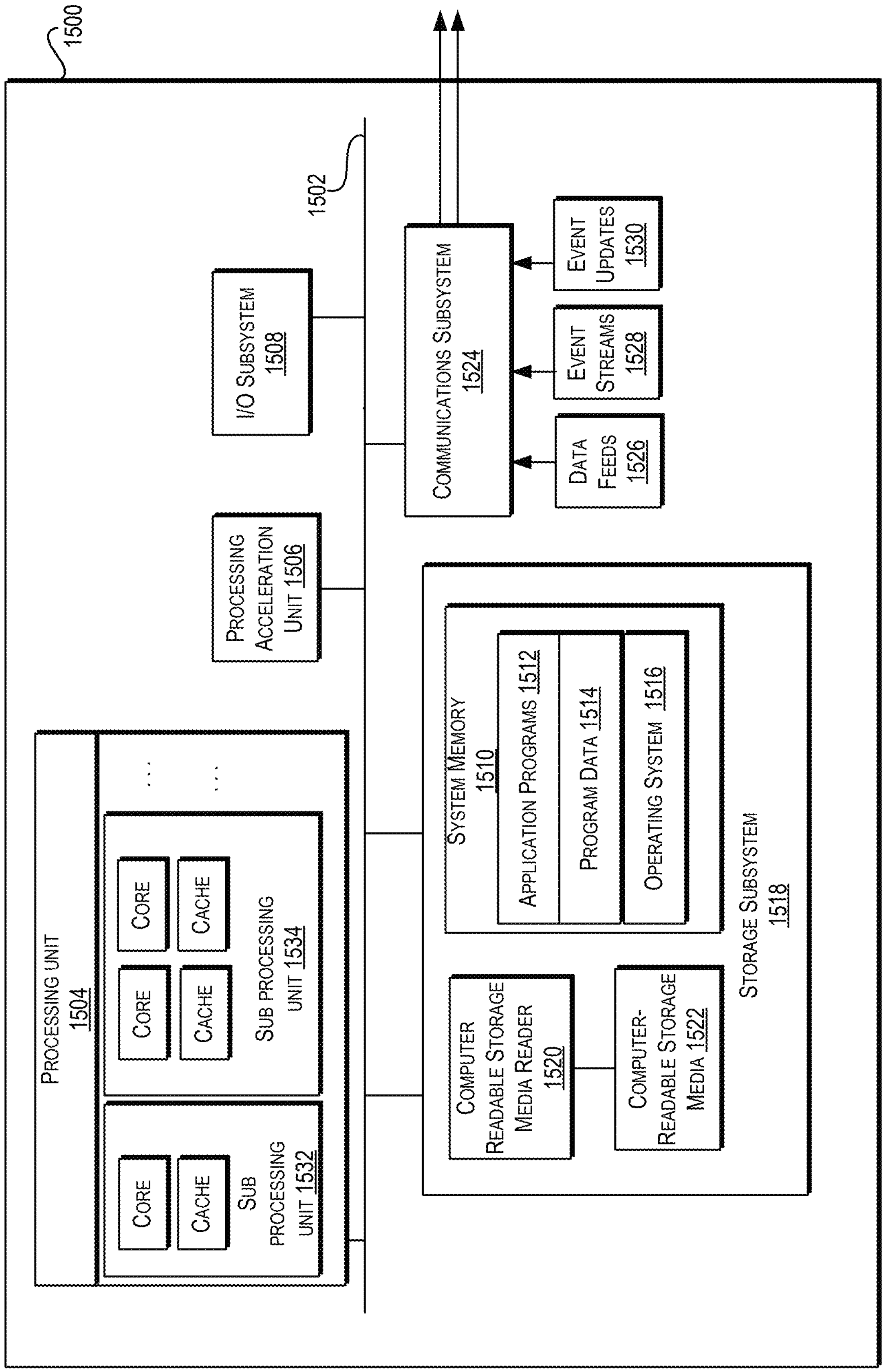
FIG. 15 is a block diagram illustrating an example computer system according to certain embodiments.

FIG. 15 illustrates an example computer system 1500, in which various embodiments may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1504 provide the functionality described above. Storage subsystem 1518 may also provide a repository for storing data used in accordance with the present disclosure.

As depicted in the example in FIG. 15, storage subsystem 1518 can include various components including a system memory 1510, computer-readable storage media 1522, and a computer readable storage media reader 1520. System memory 1510 may store program instructions that are loadable and executable by processing unit 1504. System memory 1510 may also store data that is used during the execution of the instructions and/or data that is generated during the execution of the program instructions. Various different kinds of programs may be loaded into system memory 1510 including but not limited to client applications, Web browsers, mid-tier applications, relational database management systems (RDBMS), virtual machines, containers, etc.

System memory 1510 may also store an operating system 1516. Examples of operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1500 executes one or more virtual machines, the virtual machines along with their guest operating systems (GOSs) may be loaded into system memory 1510 and executed by one or more processors or cores of processing unit 1504.

System memory 1510 can come in different configurations depending upon the type of computer system 1500. For example, system memory 1510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1510 may include a basic input/output system (BIOS) containing basic routines that help to transfer information between elements within computer system 1500, such as during start-up.

Computer-readable storage media 1522 may represent remote, local, fixed, and/or removable storage devices plus storage media for temporarily and/or more permanently containing, storing, computer-readable information for use by computer system 1500 including instructions executable by processing unit 1504 of computer system 1500.

Computer-readable storage media 1522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1522 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Machine-readable instructions executable by one or more processors or cores of processing unit 1504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

accessing a set of data points of a training dataset, each data point of the set of data points comprising a prompt including a natural language query and a correct query language statement for the natural language query;

generating a first preference alignment training dataset by:

predicting, using a first trained large language model, candidate query language statements for the natural language queries of a first subset of data points of the set of data points, determining that the candidate query language statements are not executable by submitting the candidate query language statements to a database system, after determining that the candidate query language statements are not executable, producing an updated version of the first subset of data points by including the candidate query language statements in the first subset of data points as incorrect query language statements for the natural language queries of the first subset of data points, and including the updated version of the first subset of data points in the first preference alignment training dataset;

generating a second preference alignment training dataset by:

causing a second trained large language model to generate synthetic natural language queries based on database schemas defined in the prompts of a second subset of data points of the set of data points;

causing the second trained large language model to predict, based on the synthetic natural language queries, executable synthetic query language statements for the synthetic natural language queries, causing the second trained large language model to predict, based on the synthetic natural language queries, non-executable synthetic query language statements for the synthetic natural language queries, generating a plurality of synthetic data points comprising the synthetic natural language queries, the executable synthetic query language statements, and the non- executable synthetic query language statements, and including the plurality of synthetic data points in the second preference alignment training dataset; and generating a preference alignment training dataset by combining the first preference alignment training dataset and the second preference alignment training dataset, wherein combining the first preference alignment training dataset and the second preference alignment training dataset comprises performing at least one filtering operation of a plurality of filtering operations on the first preference alignment training dataset and the second preference alignment training dataset.

2. The method of claim 1, further comprising:

accessing a machine-learning model;

using the preference alignment training dataset to generate a fine-tuned version of the machine-learning model; and deploying the fine-tuned version of the machine-learning model to a system.

3. The method of claim 1, wherein performing the at least one filtering operation of the plurality of filtering operations comprises:

for each synthetic data point in the second preference alignment training dataset, determining whether the executable synthetic query language statement is executable and whether the non-executable synthetic query language statement is not executable by submitting the executable synthetic query language statement and the non-executable synthetic query language statement to the database system.

4. The method of claim 3, wherein performing the at least one filtering operation of the plurality of filtering operations further comprises:

generating a filtered second preference alignment training dataset by removing from the second preference alignment training dataset any synthetic data points that are determined to erroneously include an executable synthetic query language statement that is not executable or a non-executable synthetic query language statement that is executable.

5. The method of claim 4, wherein performing the at least one filtering operation of the plurality of filtering operations further comprises:

scoring, using at least one large language model-as-a-judge trained to grade query language statements, a quality of the correct query language statement and the incorrect query language statement of each data point of the updated version of the first subset of data points in the first preference alignment training dataset and a quality of the executable synthetic query language statement and the non-executable synthetic query language statement of each synthetic data point in the filtered second preference alignment training dataset, given the prompts associated therewith.

6. The method of claim 5, wherein performing the at least one filtering operation of the plurality of filtering operations further comprises:

optimizing the preference alignment training dataset to include only a plurality of the data points of the updated version of the first subset of data points in the first preference alignment training dataset having executable query language statements and non-executable query language statements receiving quality scores that meet predetermined threshold values, and a plurality of the synthetic data points of the second preference alignment training dataset having executable synthetic query language statements and non-executable synthetic query language statements receiving quality scores that meet predetermined threshold values.

7. The method of claim 5, wherein the at least one large language model-as-a-judge is a plurality of large language model judges and the plurality of large language model judges are used in one or both of two different configurations, comprising:

a panel configuration, where each large language model judge is assigned a different weight based on a strength of the large language model used as the judge; and a serial configuration, where the plurality of large language model judges are arranged from weakest to strongest, and filtering occurs at each large language model judge in a serial manner.

8. A system comprising:

one or more processors; and one or more computer-readable media storing instructions which, when executed by the one or more processors, cause the system to perform operations comprising:

accessing a set of data points of a training dataset, each data point of the set of data points comprising a prompt including a natural language query and a correct query language statement for the natural language query;

generating a first preference alignment training dataset by:

predicting, using a first trained large language model, candidate query language statements for the natural language queries of a first subset of data points of the set of data points, determining that the candidate query language statements are not executable by submitting the candidate query language statements to a database system, after determining that the candidate query language statements are not executable, producing an updated version of the first subset of data points by including the candidate query language statements in the first subset of data points as incorrect query language statements for the natural language queries of the first subset of data points, and including the updated version of the first subset of data points in the first preference alignment training dataset;

generating a second preference alignment training dataset by:

causing a second trained large language model to generate synthetic natural language queries based on database schemas defined in the prompts of a second subset of data points of the set of data points;

causing the second trained large language model to predict, based on the synthetic natural language queries, executable synthetic query language statements for the synthetic natural language queries, causing the second trained large language model to predict, based on the synthetic natural language queries, non-executable synthetic query language statements for the synthetic natural language queries, generating a plurality of synthetic data points comprising the synthetic natural language queries, the executable synthetic query language statements, and the non- executable synthetic query language statements, and including the plurality of synthetic data points in the second preference alignment training dataset; and generating a preference alignment training dataset by combining the first preference alignment training dataset and the second preference alignment training dataset, wherein combining the first preference alignment training dataset and the second preference alignment training dataset comprises performing at least one filtering operation of a plurality of filtering operations on the first preference alignment training dataset and the second preference alignment training dataset.

9. The system of claim 8, wherein the operations further comprise:

accessing a machine-learning model;

using the preference alignment training dataset to generate a fine-tuned version of the machine-learning model; and deploying the fine-tuned version of the machine-learning model to a system.

10. The system of claim 8, wherein the performing the at least one filtering operation of the plurality of filtering operations comprises:

for each synthetic data point in the second preference alignment training dataset, determining whether the executable synthetic query language statement is executable and whether the non-executable synthetic query language statement is not executable by submitting the executable synthetic query language statement and the non-executable synthetic query language statement to the database system.

11. The system of claim 10, wherein the performing the at least one filtering operation of the plurality of filtering operations further comprises:

generating a filtered second preference alignment training dataset by removing from the second preference alignment training dataset any synthetic data points that are determined to erroneously include an executable synthetic query language statement that is not executable or a non-executable synthetic query language statement that is executable.

12. The system of claim 11, wherein the performing the at least one filtering operation of the plurality of filtering operations further comprises:

scoring, using at least one large language model-as-a-judge trained to grade query language statements, a quality of the correct query language statement and the incorrect query language statement of each data point of the updated version of the first subset of data points in the first preference alignment training dataset and a quality of the executable synthetic query language statement and the non-executable synthetic query language statement of each synthetic data point in the filtered second preference alignment training dataset, given the prompts associated therewith.

13. The system of claim 12, wherein the performing the at least one filtering operation of the plurality of filtering operations further comprises:

optimizing the preference alignment training dataset to include only a plurality of the data points of the updated version of the first subset of data points in the first preference alignment training dataset having executable query language statements and non-executable query language statements receiving quality scores that meet predetermined threshold values, and a plurality of the synthetic data points of the second preference alignment training dataset having executable synthetic query language statements and non-executable synthetic query language statements receiving quality scores that meet predetermined threshold values.

14. The system of claim 12, wherein the at least one large language model-as-a-judge is a plurality of large language model judges and the plurality of large language model judges are usable in one or both of two different configurations, comprising:

a panel configuration, where each large language model judge is assigned a different weight based on a strength of the large language model used as the judge; and a serial configuration, where the plurality of large language model judges are arranged from weakest to strongest, and filtering occurs at each large language model judge in a serial manner.

15. One or more non-transitory computer-readable media storing instructions which, when executed by one or more processors, cause a system to perform operations comprising:

accessing a set of data points of a training dataset, each data point of the set of data points comprising a prompt including a natural language query and a correct query language statement for the natural language query;

generating a first preference alignment training dataset by:

predicting, using a first trained large language model, candidate query language statements for the natural language queries of a first subset of data points of the set of data points, determining that the candidate query language statements are not executable by submitting the candidate query language statements to a database system, after determining that the candidate query language statements are not executable, producing an updated version of the first subset of data points by including the candidate query language statements in the first subset of data points as incorrect query language statements for the natural language queries of the first subset of data points, and including the updated version of the first subset of data points in the first preference alignment training dataset;

generating a second preference alignment training dataset by:

causing a second trained large language model to generate synthetic natural language queries based on database schemas defined in the prompts of a second subset of data points of the set of data points;

causing the second trained large language model to predict, based on the synthetic natural language queries, executable synthetic query language statements for the synthetic natural language queries, causing the second trained large language model to predict, based on the synthetic natural language queries, non-executable synthetic query language statements for the synthetic natural language queries, generating a plurality of synthetic data points comprising the synthetic natural language queries, the executable synthetic query language statements, and the non- executable synthetic query language statements, and including the plurality of synthetic data points in the second preference alignment training dataset; and generating a preference alignment training dataset by combining the first preference alignment training dataset and the second preference alignment training dataset, wherein combining the first preference alignment training dataset and the second preference alignment training dataset comprises performing at least one filtering operation of a plurality of filtering operations on the first preference alignment training dataset and the second preference alignment training dataset.

16. The one or more non-transitory computer-readable media of claim 15, wherein the operations further comprise:

accessing a machine-learning model;

using the preference alignment training dataset to generate a fine-tuned version of the machine-learning model; and deploying the fine-tuned version of the machine-learning model to a system.

17. The one or more non-transitory computer-readable media of claim 15, wherein the performing the at least one filtering operation of the plurality of filtering operations comprises:

for each synthetic data point in the second preference alignment training dataset, determining whether the executable synthetic query language statement is executable and whether the non-executable synthetic query language statement is not executable by submitting the executable synthetic query language statement and the non-executable synthetic query language statement to the database system; and generating a filtered second preference alignment training dataset by removing from the second preference alignment training dataset any synthetic data points that are determined to erroneously include an executable synthetic query language statement that is not executable or a non-executable synthetic query language statement that is executable.

18. The one or more non-transitory computer-readable media of claim 17, wherein the performing the at least one filtering operation of the plurality of filtering operations further comprises:

scoring, using at least one large language model-as-a-judge trained to grade query language statements, a quality of the correct query language statement and the incorrect query language statement of each data point of the updated version of the first subset of data points in the first preference alignment training dataset and a quality of the executable synthetic query language statement and the non-executable synthetic query language statement of each synthetic data point in the filtered second preference alignment training dataset, given the prompts associated therewith.

19. The one or more non-transitory computer-readable media of claim 18, wherein the performing the at least one filtering operation of the plurality of filtering operations further comprises:

optimizing the preference alignment training dataset to include only a plurality of the data points of the updated version of the first subset of data points in the first preference alignment training dataset having executable query language statements and non-executable query language statements receiving quality scores that meet predetermined threshold values, and a plurality of the synthetic data points of the second preference alignment training dataset having executable synthetic query language statements and non-executable synthetic query language statements receiving quality scores that meet predetermined threshold values.

20. The one or more non-transitory computer-readable media of claim 18, wherein the at least one large language model-as-a-judge is a plurality of large language model judges and the plurality of large language model judges are usable in one or both of two different configurations, comprising:

a panel configuration, where each large language model judge is assigned a different weight based on a strength of the large language model used as the judge; and a serial configuration, where the plurality of large language model judges are arranged from weakest to strongest, and filtering occurs at each large language model judge in a serial manner.

* * * * *